US012749186B1

(12) United States Patent
Colditz et al.

(10) Patent No.: US 12,749,186 B1
(45) Date of Patent: Sep. 29, 2026

(54) SYSTEMS AND METHODS FOR AUTOMATED VOLUMETRIC MAMMOGRAPHIC DENSITY ASSESSMENT

(71) Applicant: Washington University, St. Louis, MO (US)

(72) Inventors: Graham Colditz, St. Louis, MO (US); Shu Jiang, St. Louis, MO (US)

(73) Assignee: Washington University, St. Louis, MO (US)

( * ) Notice: Subject to any disclaimer, the term of this patent is extended or adjusted under 35 U.S.C. 154(b) by 205 days.

(21) Appl. No.: 18/505,107

(22) Filed: Nov. 8, 2023

Related U.S. Application Data

(60) Provisional application No. 63/423,732, filed on Nov. 8, 2022.

(51) Int. Cl.
*G06T 7/13* (2017.01)
*G06T 5/90* (2024.01)
(Continued)

(52) U.S. Cl.
CPC .............. *G06T 7/0012* (2013.01); *G06T 5/90* (2024.01); *G06T 7/13* (2017.01); *G06T 7/136* (2017.01); *G06T 2207/10081* (2013.01); *G06T 2207/10088* (2013.01); *G06T 2207/10112* (2013.01); *G06T 2207/10116* (2013.01); *G06T 2207/30068* (2013.01)

(58) Field of Classification Search
CPC ........... G06T 7/0012; G06T 5/90; G06T 7/13; G06T 7/136; G06T 2207/10081; G06T 2207/10088; G06T 2207/10112; G06T 2207/10116; G06T 2207/30068
See application file for complete search history.

(56) References Cited

U.S. PATENT DOCUMENTS

| | | | |
|---|---|---|---|
| 9,304,973 | B2 | 4/2016 | Heine et al. |
| 10,595,805 | B2 | 3/2020 | Mainprize et al. |

(Continued)

FOREIGN PATENT DOCUMENTS

| | | | | |
|---|---|---|---|---|
| GB | 2010001472 | * 12/2010 | ........... | G06T 7/0012 |
| WO | WO-2011015818 A1 | * 2/2011 | ........... | G06T 7/0012 |

OTHER PUBLICATIONS

Holland et al. Quantification of masking risk in screening mammography with volumetric breast density maps. Breast Cancer Res Treat (2017), vol. 162, pp. 541-548.

(Continued)

*Primary Examiner* — Chan S Park
*Assistant Examiner* — Emily Rose Hauk

(57) ABSTRACT

The present disclosure provides for systems and methods to automatically assess breast density from at least one medical image. The systems include at least one processor in communication with at least one memory device that can receive one or more medical images and estimate the volumetric percent density (VPD), dense volume (DV), and non-dense volume (NDV) of an individual or both breasts from the one or more medical images using automated pixel thresholding. The methods include automatically estimating volumetric percent density (VPD), dense volume (DV), and non-dense volume (NDV) of an individual breast or both breasts from the one or more medical images.

5 Claims, 29 Drawing Sheets
(13 of 29 Drawing Sheet(s) Filed in Color)

(51) Int. Cl.
*G06T 7/00* (2017.01)
*G06T 7/136* (2017.01)

(56) References Cited

U.S. PATENT DOCUMENTS

| | | | | |
|---|---|---|---|---|
| 2011/0026791 | A1* | 2/2011 | Collins | G06T 7/136 382/131 |
| 2011/0052025 | A1* | 3/2011 | Highnam | G06T 7/0016 382/131 |
| 2016/0029979 | A1 | 2/2016 | Mawdsley et al. | |
| 2016/0113947 | A1* | 4/2016 | Birrell | A61K 9/0053 514/171 |
| 2016/0256126 | A1* | 9/2016 | Wehnes | G06T 7/11 |
| 2018/0132810 | A1 | 5/2018 | de Sisternes et al. | |
| 2018/0315186 | A1* | 11/2018 | Highnam | G06T 7/0012 |
| 2020/0360312 | A1 | 11/2020 | Hall et al. | |

OTHER PUBLICATIONS

Jobling. Mammographic (Breast) Density as a Potential Biomarker for Endocrine Trial Treatment Efficacy in Breast Cancer Prevention. Dissertation, University of Newcastle, NSW, Australia, 2017.

Saffari et al. Fully Automated Breast Density Segmentation and Classification Using Deep Learning. Diagnostics, 2020, vol. 10, No. 988, pp. 1-20; doi:10.3390/diagnostics10110988.

* cited by examiner

| | | | | | | | | | | | | |
|---|---|---|---|---|---|---|---|---|---|---|---|---|
| 18 | 17 | 16 | 15 | 13 | 14 | 15 | 15 | 21 | 21 | 21 | 21 | 20 |
| 22 | 21 | 21 | 20 | 20 | 20 | 21 | 21 | 26 | 26 | 24 | 24 | 22 |
| 28 | 27 | 27 | 28 | 28 | 28 | 29 | 29 | 32 | 32 | 29 | 28 | 25 |
| 33 | 32 | 32 | 33 | 33 | 33 | 35 | 35 | 38 | 38 | 35 | 33 | 30 |
| 56 | 53 | 52 | 53 | 54 | 56 | 60 | 60 | 65 | 65 | 59 | 57 | 52 |
| 58 | 55 | 54 | 55 | 56 | 58 | 62 | 62 | 67 | 67 | 61 | 59 | 54 |
| 98 | 94 | 93 | 89 | 87 | 87 | 87 | 87 | 90 | 90 | 89 | 89 | 79 |
| 106 | 102 | 100 | 96 | 93 | 93 | 92 | 92 | 94 | 94 | 94 | 95 | 83 |
| 119 | 117 | 115 | 112 | 110 | 110 | 110 | 110 | 111 | 111 | 113 | 115 | 107 |
| 128 | 127 | 126 | 124 | 122 | 122 | 123 | 123 | 122 | 122 | 126 | 128 | 123 |
| 127 | 127 | 126 | 126 | 125 | 126 | 128 | 128 | 129 | 129 | 128 | 129 | 126 |
| 128 | 129 | 129 | 131 | 133 | 135 | 140 | 140 | 142 | 142 | 134 | 132 | 134 |
| 126 | 128 | 129 | 132 | 134 | 136 | 141 | 141 | 142 | 142 | 135 | 133 | 135 |
| 113 | 124 | 128 | 136 | 143 | 145 | 150 | 150 | 147 | 147 | 143 | 141 | 144 |
| 112 | 124 | 128 | 136 | 143 | 145 | 150 | 150 | 147 | 147 | 143 | 142 | 145 |
| 112 | 125 | 129 | 135 | 141 | 144 | 152 | 153 | 162 | 163 | 164 | 165 | 169 |

FIG. 5C

SYSTEMS AND METHODS FOR AUTOMATED VOLUMETRIC MAMMOGRAPHIC DENSITY ASSESSMENT

CROSS-REFERENCE TO RELATED APPLICATIONS

This application claims priority from U.S. Provisional Application Ser. No. 63/423,732 filed on Nov. 8, 2022, which is incorporated herein by reference in its entirety.

STATEMENT REGARDING FEDERALLY SPONSORED RESEARCH OR DEVELOPMENT

Not applicable.

MATERIAL INCORPORATED-BY-REFERENCE

Not applicable.

FIELD OF THE INVENTION

The present disclosure generally relates to computing systems and methods of use to automatically assess volumetric mammographic density.

BACKGROUND OF THE INVENTION

In the era of precision prevention, there is increasing emphasis on getting the right prevention to the right women at the right time. Underpinning this approach is the need for risk assessments that can be accessed in real-time in the clinic. Strong evidence shows that adding mammographic density to breast cancer risk prediction models improves their performance. Thus, the major breast cancer risk models now also include a measure of breast density which is considered an intermediate marker of risk as well as a surrogate endpoint in prevention trials.

Efficient processing of digital images for real-time breast cancer risk prediction to guide subsequent clinical risk management is a priority. Breast cancer screening guidelines and risk reduction guidelines will be facilitated by these methods as will ongoing clinical implementation studies.

Dynamic or updated prediction needs to incorporate the rich data contained in repeated measures of digital breast images, plus lifestyle factors that include weight, and hormone therapy. The processing of digital mammograms must, therefore, be efficient to incorporate these disparate data and tie them to clinical feedback and decision-making by women and their providers.

There is a long record of epidemiologic investigation using mammographic density estimated from films, and more recently digital images. Additional attention is focused on texture and other features beyond breast density. The majority of current breast density readings rely heavily on clinician judgment. Cumulus, for example, is one of the most widely used tools for density estimation on a continuous scale, and it is a semi-automated tool that requires clinician identification of high-density areas. However, the clinician-to-clinician variability in the high-density area identification process is inevitable, resulting in inconsistencies and significant time costs. There are also fully automated tools such as Volpara and Libra for estimating the volumetric breast density (VPD). However, all of the existing automated tools are focused on estimating an average VPD between the two breasts.

Studies show that cancer does not simultaneously develop in both breasts. The risk of contralateral breast cancer rises steadily after the first breast cancer to a 10-year cumulative incidence of four percent. While the correlation of breast density between the two breasts is high at the baseline, this is not true over time as one breast develops breast cancer and the other may continue to develop premalignant or malignant structures over the ensuing decades. For more advanced stages of premalignant lesions like DCIS, the mammograms have no reason to be averaged.

SUMMARY OF THE INVENTION

Among the various aspects of the present disclosure is the provision of systems and methods to automatically assess breast density from a medical image.

Briefly, therefore, the present disclosure is directed to systems and methods to automatically assess breast density from a medical image.

In one aspect, a system for automatically estimating the volumetric percent density (VPD), dense volume (DV), and non-dense volume (NDV) of at least one individual breast of a subject obtained from the at least one breast that includes at least one processor in communication with at least one memory device. The processor is configured to receive the at least one medical image, each medical image obtained from the individual breast and comprising a plurality of pixels and associated pixel coordinates and pixel values, wherein each pixel value is indicative of a density of breast tissue within the pixel; automatically determine a threshold pixel value for each medical image based on the pixel values of the plurality of pixels; classify each pixel with a pixel value greater than the threshold value as a dense pixel containing dense breast tissue and the remaining pixels as non-dense pixels containing non-dense breast tissue; and estimate the volumetric percent density (VPD), dense volume (DV), and non-dense volume (NDV) for each medical image based on the volumes of all dense pixels and all non-dense pixels of each medical image. In some aspects, the at least one medical image is selected from a 2D mammogram, a planar section of a 3D digital breast tomosynthesis image, a planar slices of an MRI image, an X-ray image, and a planar slice of a CT image. In some aspects, the at least one medical image comprises medical images of both breasts of an individual, and the at least one processor is further configured to average the VPD, DV, and NDV from the medical images of both breasts of the individual. In some aspects, the at least one processor automatically determines a threshold pixel value for each medical image by performing a multi-fold cross-validation over a range of candidate threshold values and selecting the candidate threshold value with the smallest mean squared error (MSE) over all folds of the cross-validation as the threshold pixel value. In some aspects, the the at least one processor is further configured to pre-process the at least one medical image to remove pixels representative of pectoral muscle, skin, and any combination thereof from the at least one medical image. In some aspects, the at least one processor pre-processes the at least one medical image by enhancing contrast within the at least one medical image, performing edge detection in the enhanced-contrast image, and removing pixels adjacent to the detected edge.

Further, the present teachings include methods to predict breast cancer through longitudinal breast density assessment from digital mammograms. In some aspects, breast density assessment can be performed with a computer-implemented method. In some aspects, the computer-implemented can automatically estimate the volumetric percent density (VPD), dense volume (DV), and non-dense volume (NDV) of an individual breast or both breasts from one or more medical images. In yet another aspect, the method can use a computing device with at least one processor in communication with at least one memory device. In another aspect, one or more medical images can be received by the computing device. In another aspect, the VPD, DV, and NVD can be estimated by the computing device using an algorithm. In one exemplary embodiment, the algorithm is automated volumetric mammographic density assessment by pixel thresholding (ADAPT). In some embodiments, the method includes averaging the VPD, DV, and NVD from the medical images of both breasts of an individual. In some embodiments, one or more of the medical images is a mammogram.

Other objects and features will be in part apparent and in part pointed out hereinafter.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 5C is a map of the digital information of the image in FIG. 5B.

Figure 1:
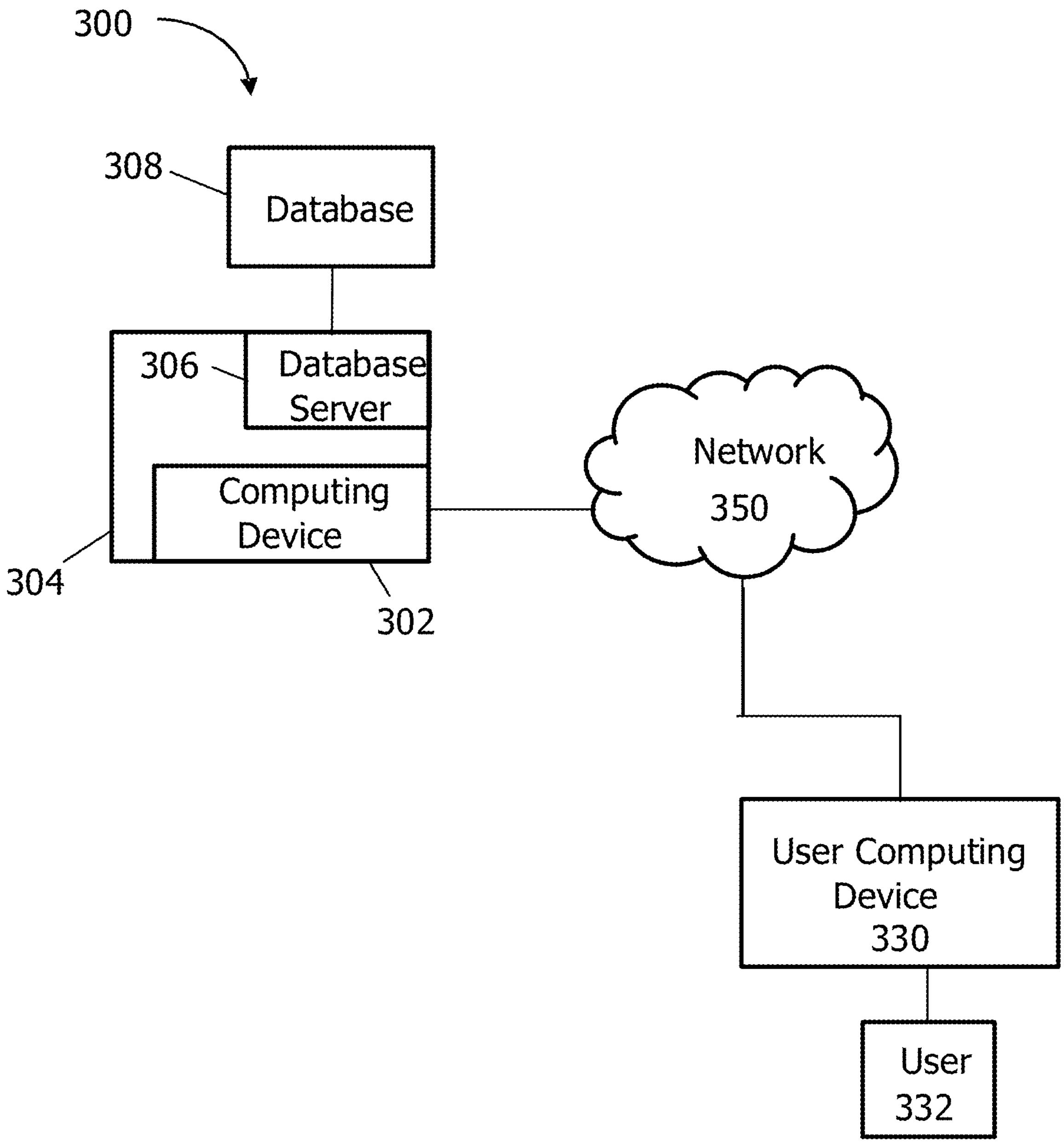
FIG. 1 is a block diagram schematically illustrating a system in accordance with one aspect of the disclosure.

Those of skill in the art will understand that the drawings, described below, are for illustrative purposes only. The drawings are not intended to limit the scope of the present teachings in any way.

DETAILED DESCRIPTION OF THE INVENTION

The present disclosure is based, at least in part, on the discovery that the automated volumetric mammographic density assessment by pixel thresholding (ADAPT) accurately assesses the volumetric percent density (VPD) in individual breasts. As shown herein, systems and methods of use are disclosed to automatically assess breast density from a medical image.

In various aspects, any suitable medical image of breast tissue may be analyzed using the disclosed methods including, but not limited to, mammograms, planar sections of 3D digital breast tomosynthesis images, planar slices of MRI images, X-ray images, planar slices of CT images.

One aspect of the present disclosure provides for a system to automatically assess the breast density of individual breasts. In some aspects, the system is configured to process a medical image and automatically quantify volumetric percent density (VPD), dense volume (DV), and non-dense volume (NDV) from one or both breasts with a computationally efficient method with an algorithm. In some aspects, VPD, DV, and NDV can be assessed for individual breasts. In other aspects, VPD, DV, and NDV can be averaged between two breasts. In some aspects, the assessment can be based on the pixel information provided by digital mammograms with ADAPT. In some embodiments, the ADAPT estimated VPD averaged between the two breasts can be calibrated with Volpara 4th edition. In some aspects, the ADAPT estimated VPD has a strong positive correlation with Volpara (Pearson correlation=0.81) with a small mean squared error (MSE=0.003). In some aspects, separate VPD estimations for individual breasts can be performed. In some embodiments, these ADAPT-estimated individual breast VPD measures range from 0.5% to <35%.

Another aspect of the present disclosure provides for methods to automatically assess the breast density of individual breasts. In some aspects, the method includes processing a medical image and automatically quantifying volumetric percent density (VPD), dense volume (DV), and non-dense volume (NDV) from one or both breasts with a computationally efficient method with an algorithm. In some aspects of the method, VPD, DV, and NDV can be assessed for individual breasts. In other aspects of the method, VPD, DV, and NDV can be averaged between two breasts. In some aspects of the method, the assessment can be based on the pixel information provided by digital mammograms with ADAPT. In some embodiments of the method, the ADAPT estimated VPD averaged between the two breasts can be calibrated with Volpara 4th edition. In some aspects, the ADAPT estimated VPD has a strong positive correlation with Volpara (Pearson correlation=0.81) with a small mean squared error (MSE=0.003). In some aspects, separate VPD estimations for individual breasts can be performed. In some embodiments, these ADAPT estimated individual breast VPD measures can range from 0.5% to <35%.

Yet another aspect of the present disclosure includes a method to predict breast cancer through longitudinal breast density assessment from digital mammograms. In some aspects, the longitudinal breast density assessment can be performed with an algorithm, which can be ADAPT. This assessment can be based on the algorithm estimating VPD, DV, or NDV from a mammogram. In some aspects, the assessment can be based on a comparison between mammograms of one or both breasts from two or more time points in an individual patient. In some aspects, baseline volumetric mammographic density in each breast can be used in breast cancer risk assessment. In another aspect, baseline volumetric breast density above a threshold value can predict the risk of developing breast cancer. In some embodiments, volumetric breast density can be inversely related to BMI. In some aspects, a significantly slower decrease in density in the breast by analysis of breast-specific density change over time can predict a high risk of developing breast cancer. In some embodiments, using repeated measures of density for each breast over time from digital mammograms, changes in density over time can predict the risk of developing breast cancer. In some embodiments, using each breast as the unit of analysis can optimize risk stratification and guide more personalized risk management.

Herein, the efficient processing of full-field breast images and generation of a breast-specific measure of DV and VPD in real-time is reported. In some aspects, this disclosed ADAPT pipeline can automatically output DV, NDV, and VPD for each breast with separate views. The average ADAPT estimated VPD is well-calibrated with Volpara (4th edition). Additionally, a freely available platform that is user-friendly and provides visualizations for DV on mammograms of any view can be provided. The computational speed is outstanding and requires less than 1 second to output on our GUI. The results suggest that the proposed pipeline can serve as a computationally efficient tool for VPD estimation and visualization either for individual breasts or averaged between the two.

There are several advantages to the platform compared to existing breast density estimation tools. For instance, it has been studied that brighter pixels within the mammogram could capture more risk-predicting information. The pipeline offers the flexibility to thresholding the pixel brightness to be brighter or dimmer than the typical Volpara-calibrated threshold for VPD estimation. In addition, the tool is the first that can output breast-specific density measures, on top of the averaged density across CC and MLO views. This could be helpful in future studies that quantify the deviation between the breasts over time between the breast that goes on to develop breast cancer and the breast that remains breast cancer-free. Such approaches could then be applied to predict the future breast cancer risk in each breast and set a threshold for transition to risk reduction interventions.

In some embodiments, the volumetric breast density can be estimated from two-dimensional mammography. In some embodiments, the estimated VPD is a surrogate to the true three-dimensional mammography. In some embodiments, the volumetric breast density can be estimated from three-dimensional mammography. Additionally, while ADAPT has been trained within an existing study that has been well validated, it can be updated continuously as more mammograms are gathered as well as using richer data sources outside of the current data sets.

In a prospective cohort study designed to evaluate breast cancer risk over time, it was observed that breast density was higher at baseline for women who would develop breast cancer than controls who remain cancer-free, and decreased significantly with time among postmenopausal women. To reflect the underlying biology of breast cancer development, the left and right breasts can be modeled independently to allow for different rates of change for the breast that would develop breast cancer and the fellow breast that remained free from breast cancer. Here the rate of decline for the breast that would develop breast cancer was significantly slower than for control women who did not develop breast cancer. This observation using longitudinal repeated measures reflects dynamic changes in breast tissue that differ significantly between women who develop breast cancer and those who do not.

MD remains the most readily available summary measure, though clinical practice uses a 4-category summary BI-RADS measure that averages the readings in the two breasts. Previous studies have used changes in category or changes on a continuous scale from digitized film images or digital mammograms. Often only 2 mammograms were used to assess change. A recent meta-analysis of 4 studies reported that an increase in the BI-RADS breast density category is associated with increased risks of breast cancer. Although MD is an accepted intermediate marker of breast cancer risk, studies of change in density are limited by the use of reader-dependent measures and the use of crude categorical measures such as BI-RADS. Study design misalignment with biology includes the use of contralateral or non-breast cancer breast density, and often a time frame for change in density that is short. Here, these limitations are moved beyond to draw on the full data of digital mammograms to capture breast-specific density.

Limitations and strengths of the current study include a population that is predominantly Caucasian (81%) or Black (13%), and analysis of digital images from only one manufacturer (Hologic). With an average of 4 or more digital mammograms per participant over an average of 9 years of follow-up, this cohort reflects current clinical practice. The cohort was generated from a population undergoing routine screening and reflects the broader community. The average time from the most recent mammogram to breast cancer diagnosis was 2 years and mammograms within 6 months of diagnosis consistent with epidemiologic studies were excluded. CC views are used as epidemiologic studies that show that associations of density with breast cancer are stronger for CC views than for MLO views.

Once mammography screening has begun from the age of 45 (American Cancer Society) or 50 (US Preventive Services Task Force) and is repeated annually or biannually, women accumulate a series of repeated mammograms. Therefore, the available data is naturally composed of longitudinal images for each breast. Traditional models focus on fixed prediction for some future time interval conditional on information gathered at the baseline. However, given the available longitudinal data, a dynamic prediction that can be updated on a real-time basis conditional on the patient's most up-to-date individualized MD trajectory could improve overall breast cancer risk classification over time. These repeated measures can be further refined for routine practice and incorporated into dynamic risk classification and hence guide personalized prevention services according to the woman's level of risk. Further research is needed to define the gain from the classification of women as higher risk earlier based on a single breast rather than averaging two breasts, to then introduce risk reduction strategies such as those currently recommended by guidelines. Finally, refining the trade-off of the number of images and the time interval between images to assess the change over time will inform translation to clinical practice.

In this prospective study using repeated images and established statistical approaches to repeated measures analysis, a one-time assessment of density which has been established as a key component for risk classification is built beyond. Systematic review shows that in models predicting women's risk of breast cancer that were published from 2007 to 2019, the addition of MD significantly increased discriminatory accuracy in 7 of 11 studies. The increase in AUC ranged from 0.03 to 0.14.36 MD is modified by adiposity but largely independent of other risk factors for breast cancer. These findings open the potential for dynamic prediction modeling to account for breast-specific density changes.

Much ongoing research focuses on mammography analysis to refine earlier diagnoses of breast cancer when the cancer is most treatable. The potential to leverage the enormous data in images to make full use of repeated measures and better classify real-time changes in future breast cancer risk will facilitate optimizing risk stratification to guide more personalized risk reduction.

Using longitudinal digital mammogram images of each breast over up to 10 years, this disclosure includes a study wherein it was found that women with a slower decline in breast density had a higher risk of developing breast cancer. In one aspect, these dynamic changes in density over time may be used to refine risk stratification and guide more individualized screening and prevention approaches.

In various aspects, at least a portion of the methods disclosed herein may be implemented using various computing systems and devices as described below. FIG. 1 depicts a simplified block diagram of a computer system 300 for implementing the image analysis methods described herein. As illustrated in FIG. 1, the computer system 302 may be configured to implement at least a portion of the tasks associated with the systems and methods for automatically assessing the densities of individual breasts from medical images. The computer system 300 may include a computing device 302. In one aspect, the computing device 302 is part of a server system 304, which also includes a database server 306. The computing device 302 is in communication with a database 308 through the database server 306. The computing device 302 is communicably coupled to a user-computing device 330 through a network 350. The network 350 may be any network that allows local area or wide area communication between the devices. For example, the network 350 may allow the communicative coupling to the Internet through at least one of many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, and a cable modem. The user-computing device 330 may be any device capable of accessing the Internet including, but not limited to, a desktop computer, a laptop computer, a personal digital assistant (PDA), a cellular phone, a smartphone, a tablet, a phablet, wearable electronics, smartwatch, or other web-based connectable equipment or mobile devices.

Figure 2:
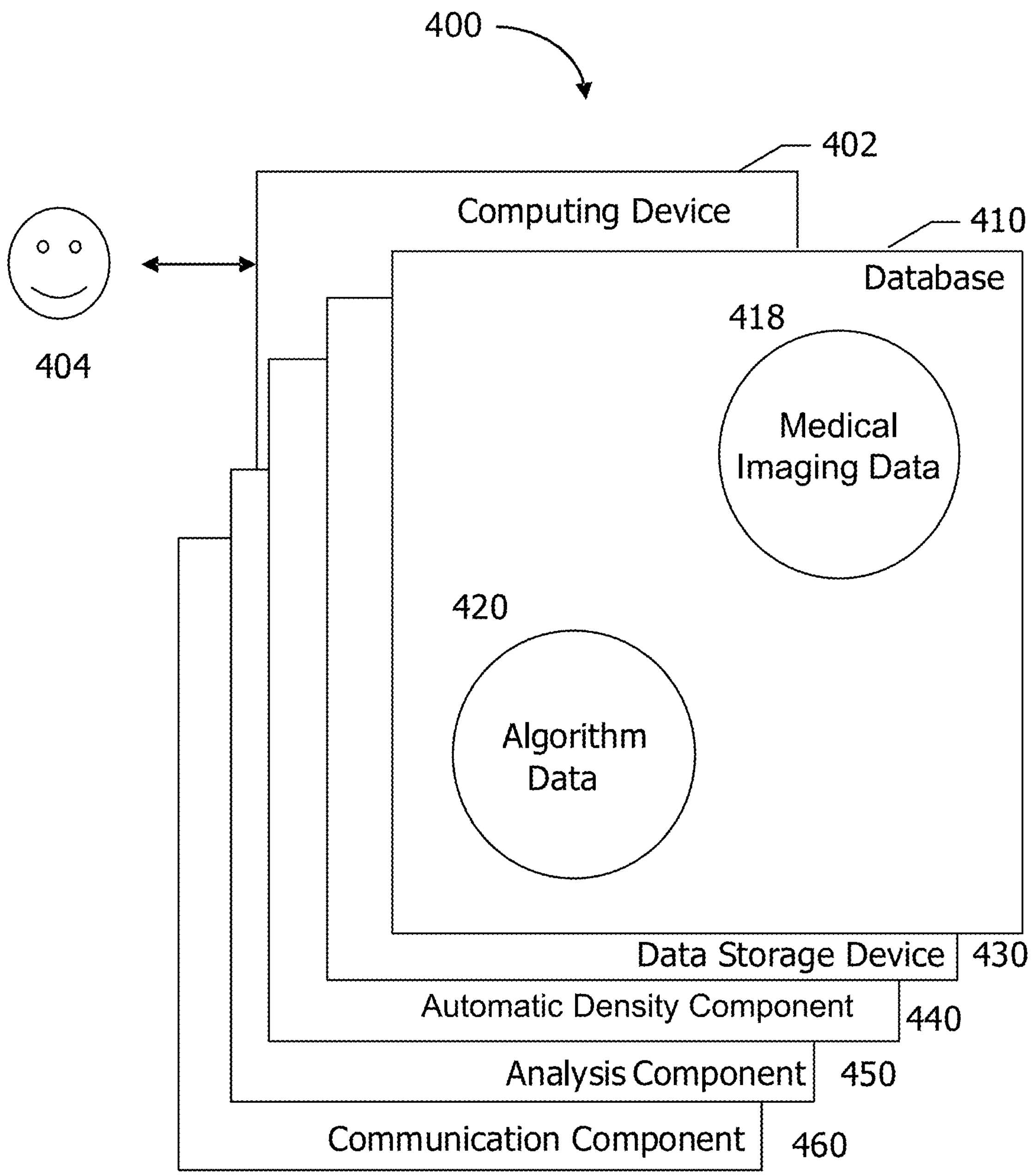
FIG. 2 is a block diagram schematically illustrating a computing device in accordance with one aspect of the disclosure.

In other aspects, the computing device 302 is configured to perform a plurality of tasks associated with the automatic breast density assessment methods described herein. FIG. 2 depicts a component configuration 400 of computing device 402, which includes database 410 along with other related computing components. In some aspects, computing device 402 is similar to computing device 302 (shown in FIG. 1). A user 404 may access components of computing device 402. In some aspects, database 410 is similar to database 308 (shown in FIG. 1).

In one aspect, database 410 includes medical imaging data 418 and algorithm data 420. Non-limiting examples of medical imaging data 418 include any data associated with medical images such as mammogram data or subsequently processed data including, but not limited to, the medical images, corresponding binary images, and aligned and registered images. Non-limiting examples of medical images include mammograms, planar sections of 3D digital breast tomosynthesis images, planar slices of MRI images, X-ray images, planar slices of CT images, and images obtained using any other suitable medical imaging modality. Non-limiting examples of suitable algorithm data 420 include any values of parameters defining the alignment and registration of the medical images according to the methods disclosed herein. Other non-limiting examples of suitable algorithm data 420 include any parameters defining the user-selected image size, the boundary of the breast area, the rectangle of minimal dimension, the view of the medical image, and any other parameter relevant to the methods of assessing breast density from medical images described herein.

Computing device 402 also includes a number of components configured to perform specific tasks. In the exemplary aspect, computing device 402 includes a data storage device 430, an automatic density component 440, analysis component 450, and communication component 460. Data storage device 430 is configured to store data received or generated by computing device 402, such as any of the data stored in database 410 or any outputs of processes implemented by any component of computing device 402. The automatic density component 440 is configured to automatically assess breast density from medical images using the methods disclosed herein.

The analysis component 450 is configured to analyze the aligned and registered medical images as disclosed herein. In some aspects, the analysis component 450 may identify an abnormal area within one medical image from a series of longitudinal medical images and trace the corresponding regions in one or more adjoining medical images in the series of longitudinal medical images for display to a user. In other aspects, the analysis component 450 may stratify risk or identify high-risk groups or low-risk groups to tailor screening and prevention based on comparisons of aligned and registered medical images using methods described herein.

The communication component 460 is configured to enable communications between computing device 402 and other devices (e.g. user computing device 330 shown in FIG. 1) over a network, such as a network 350 (shown in FIG. 1), or a plurality of network connections using predefined network protocols such as TCP/IP (Transmission Control Protocol/Internet Protocol).

Figure 3:
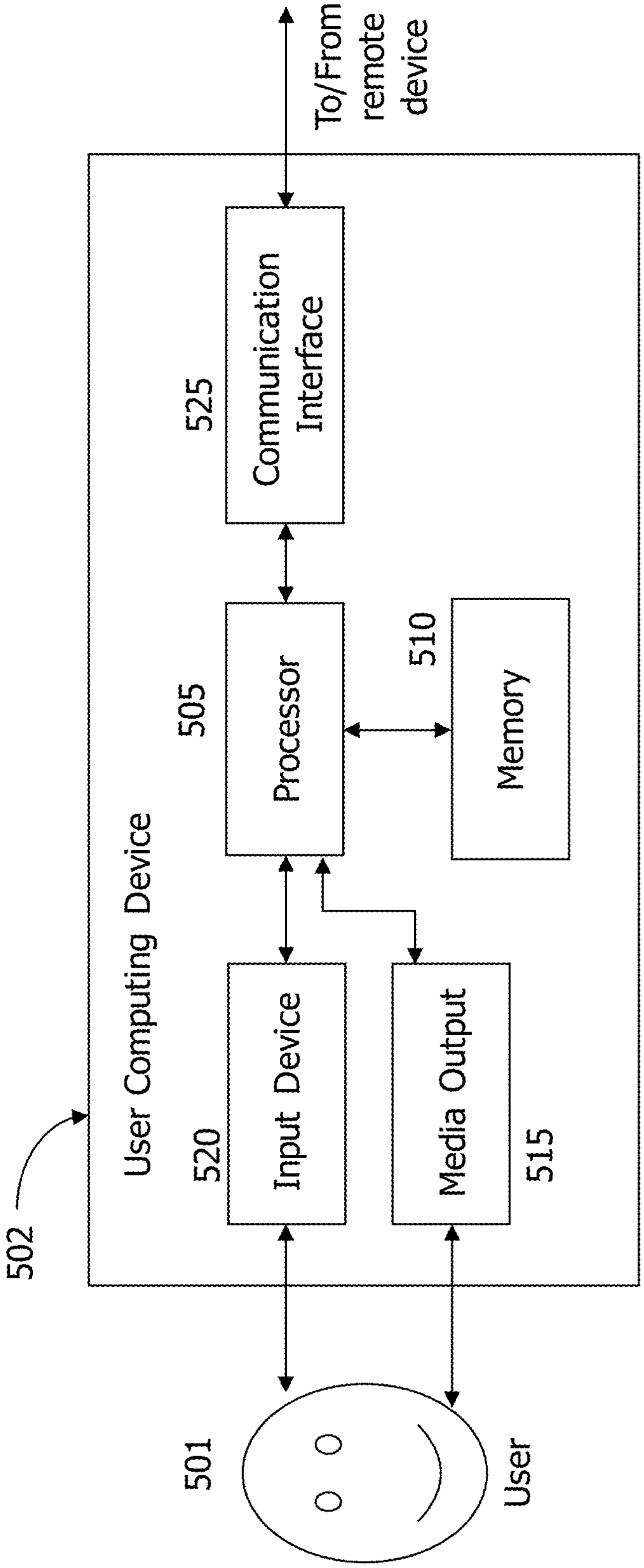
FIG. 3 is a block diagram schematically illustrating a remote or user computing device in accordance with one aspect of the disclosure.

FIG. 3 depicts a configuration of a remote or user-computing device 502, such as the user computing device 330 shown in FIG. 1. Computing device 502 may include a processor 505 for executing instructions. In some aspects, executable instructions may be stored in a memory area 510. Processor 505 may include one or more processing units (e.g., in a multi-core configuration). Memory area 510 may be any device allowing information such as executable instructions and/or other data to be stored and retrieved. Memory area 510 may include one or more computer-readable media.

Computing device 502 may also include at least one media output component 515 for presenting information to a user 501. Media output component 515 may be any component capable of conveying information to user 501. In some aspects, media output component 515 may include an output adapter, such as a video adapter and/or an audio adapter. An output adapter may be operatively coupled to processor 505 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some aspects, media output component 515 may be configured to present an interactive user interface (e.g., a web browser or client application) to user 501.

In some aspects, computing device 502 may include an input device 520 for receiving input from user 501. Input device 520 may include, for example, a keyboard, a pointing device, a mouse, a stylus, a touch-sensitive panel (e.g., a touchpad or a touch screen), a camera, a gyroscope, an accelerometer, a position detector, and/or an audio input device. A single component such as a touch screen may function as both an output device of media output component 515 and input device 520.

Computing device 502 may also include a communication interface 525, which may be communicatively coupleable to a remote device. Communication interface 525 may include, for example, a wired or wireless network adapter or a wireless data transceiver for use with a mobile phone network (e.g., Global System for Mobile communications (GSM), 3G, 4G, or Bluetooth® wireless technology) or other mobile data network (e.g., Worldwide Interoperability for Microwave Access (WIMAX®)).

Stored in memory area 510 are, for example, computer-readable instructions for providing a user interface to user 501 via media output component 515 and, optionally, receiving and processing input from input device 520. A user interface may include, among other possibilities, a web browser and client application. Web browsers enable users 501 to display and interact with media and other information typically embedded on a web page or a website from a web server. A client application allows users 501 to interact with a server application associated with, for example, a vendor or business.

Figure 4:
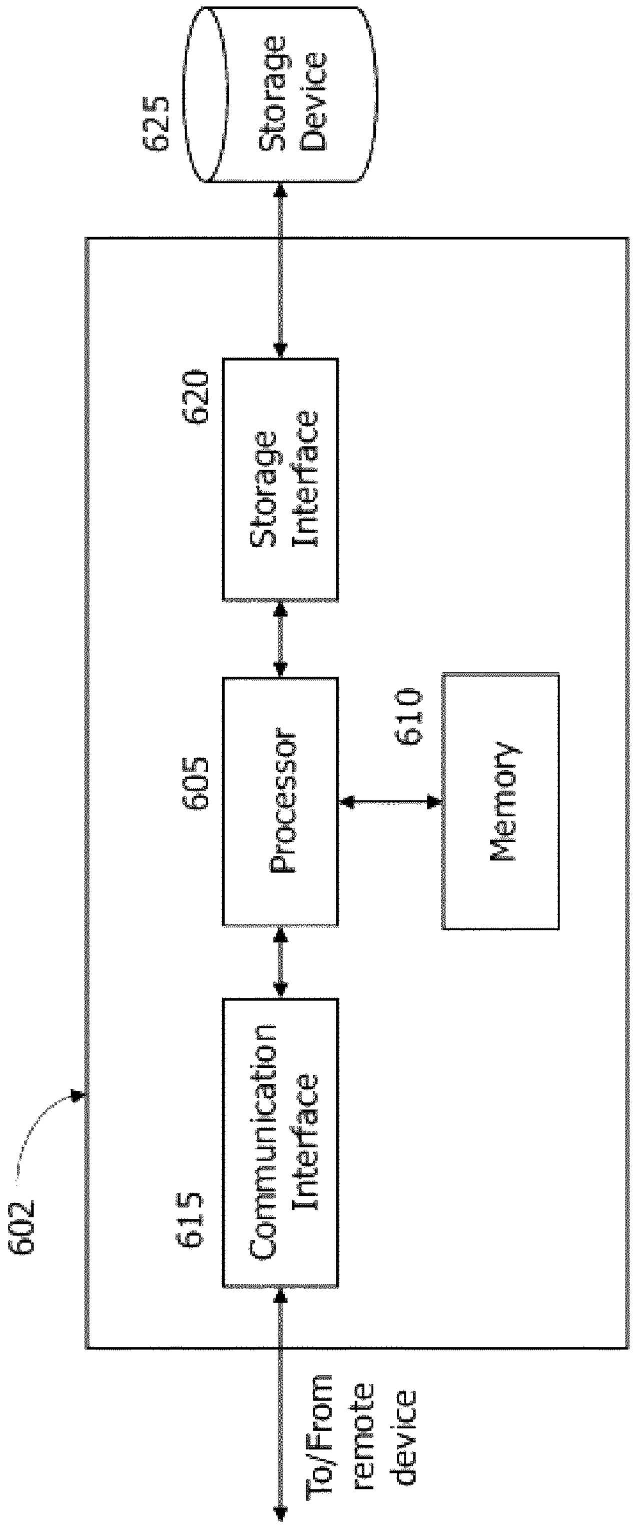
FIG. 4 is a block diagram schematically illustrating a server system in accordance with one aspect of the disclosure.

FIG. 4 illustrates an example configuration of a server system 602. Server system 602 may include, but is not limited to, database server 306 and computing device 302 (both shown in FIG. 1). In some aspects, server system 602 is similar to server system 304 (shown in FIG. 1). Server system 602 may include a processor 605 for executing instructions. Instructions may be stored in a memory area 610, for example. Processor 605 may include one or more processing units (e.g., in a multi-core configuration).

Processor 605 may be operatively coupled to a communication interface 615 such that server system 602 may be capable of communicating with a remote device such as user computing device 330 (shown in FIG. 1) or another server system 602. For example, communication interface 615 may receive requests from a user computing device 330 via a network 350 (shown in FIG. 1).

Processor 605 may also be operatively coupled to a storage device 625. Storage device 625 may be any computer-operated hardware suitable for storing and/or retrieving data. In some aspects, storage device 625 may be integrated into server system 602. For example, server system 602 may include one or more hard disk drives as storage device 625. In other aspects, storage device 625 may be external to server system 602 and may be accessed by a plurality of server systems 602. For example, storage device 625 may include multiple storage units such as hard disks or solid-state disks in a redundant array of inexpensive disks (RAID) configuration. Storage device 625 may include a storage area network (SAN) and/or a network attached storage (NAS) system.

In some aspects, processor 605 may be operatively coupled to storage device 625 via a storage interface 620. Storage interface 620 may be any component capable of providing processor 605 with access to storage device 625. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 625.

Memory areas 510 (shown in FIG. 3) and 610 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only and are thus not limiting as to the types of memory usable for storage of a computer program.

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on vehicle or mobile devices, or associated with smart infrastructure or remote servers), and/or via computer-executable instructions stored on non-transitory computer-readable media or medium.

In some aspects, a computing device is configured to implement machine learning, such that the computing device "learns" to analyze, organize, and/or process data without being explicitly programmed. Machine learning may be implemented through machine learning (ML) methods and algorithms. In one aspect, a machine learning (ML) module is configured to implement ML methods and algorithms. In some aspects, ML methods and algorithms are applied to data inputs and generate machine learning (ML) outputs. Data inputs may further include sequencing data, sensor data, image data, video data, telematics data, authentication data, authorization data, security data, mobile device data, geolocation information, transaction data, personal identification data, financial data, usage data, weather pattern data, "big data" sets, and/or user preference data. In some aspects, data inputs may include certain ML outputs.

In some aspects, at least one of a plurality of ML methods and algorithms may be applied, which may include but are not limited to linear or logistic regression, instance-based algorithms, regularization algorithms, decision trees, Bayesian networks, cluster analysis, association rule learning, artificial neural networks, deep learning, dimensionality reduction, and support vector machines. In various aspects, the implemented ML methods and algorithms are directed toward at least one of a plurality of categorizations of machine learning, such as supervised learning, unsupervised learning, and reinforcement learning.

In one aspect, ML methods and algorithms are directed toward supervised learning, which involves identifying patterns in existing data to make predictions about subsequently received data. Specifically, ML methods and algorithms directed toward supervised learning are "trained" through training data, which includes example inputs and associated example outputs. Based on the training data, the ML methods and algorithms may generate a predictive function that maps outputs to inputs and utilize the predictive function to generate ML outputs based on data inputs. The example inputs and example outputs of the training data may include any of the data inputs or ML outputs described above.

In another aspect, ML methods and algorithms are directed toward unsupervised learning, which involves finding meaningful relationships in unorganized data. Unlike supervised learning, unsupervised learning does not involve user-initiated training based on example inputs with associated outputs. Rather, in unsupervised learning, unlabeled data, which may be any combination of data inputs and/or ML outputs as described above, is organized according to an algorithm-determined relationship.

In yet another aspect, ML methods and algorithms are directed toward reinforcement learning, which involves optimizing outputs based on feedback from a reward signal. Specifically, ML methods and algorithms directed toward reinforcement learning may receive a user-defined reward signal definition, receive a data input, utilize a decision-making model to generate an ML output based on the data input, receive a reward signal based on the reward signal definition and the ML output, and alter the decision-making model so as to receive a stronger reward signal for subsequently generated ML outputs. The reward signal definition may be based on any of the data inputs or ML outputs described above. In one aspect, an ML module implements reinforcement learning in a user recommendation application. The ML module may utilize a decision-making model to generate a ranked list of options based on user information received from the user and may further receive selection data based on a user selection of one of the ranked options. A reward signal may be generated based on comparing the selection data to the ranking of the selected option. The ML module may update the decision-making model such that subsequently generated rankings more accurately predict a user selection.

As will be appreciated based upon the foregoing specification, the above-described aspects of the disclosure may be implemented using computer programming or engineering techniques including computer software, firmware, hardware, or any combination or subset thereof. Any such resulting program, having computer-readable code means, may be embodied or provided within one or more computer-readable media, thereby making a computer program product, i.e., an article of manufacture, according to the discussed aspects of the disclosure. The computer-readable media may be, for example, but is not limited to, a fixed (hard) drive, diskette, optical disk, magnetic tape, semiconductor memory such as read-only memory (ROM), and/or any transmitting/receiving media, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus, and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application-specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are examples only and are thus not limiting as to the types of memory usable for storage of a computer program.

In one aspect, a computer program is provided, and the program is embodied on a computer-readable medium. In one aspect, the system is executed on a single computer system, without requiring a connection to a server computer. In a further aspect, the system is being run in a Windows® environment (Windows is a registered trademark of Microsoft Corporation, Redmond, Washington). In yet another aspect, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some aspects, the system includes multiple components distributed among a plurality of computing devices. One or more components may be in the form of computer-executable instructions embodied in a computer-readable medium. The systems and processes are not limited to the specific aspects described herein. In addition, components of each system and each process can be practiced independently and separately from other components and processes described herein. Each component and process can also be used in combination with other assembly packages and processes. The present aspects may enhance the functionality and functioning of computers and/or computer systems.

The methods and algorithms of the invention may be enclosed in a controller or processor. Furthermore, methods and algorithms of the present invention can be embodied as a computer-implemented method or methods for performing such computer-implemented method or methods, and can also be embodied in the form of a tangible or non-transitory computer-readable storage medium containing a computer program or other machine-readable instructions (herein "computer program"), wherein when the computer program is loaded into a computer or other processor (herein "computer") and/or is executed by the computer, the computer becomes an apparatus for practicing the method or methods. Storage media for containing such computer programs include for example, floppy disks and diskettes, compact disk (CD)-ROMs (whether or not writeable), DVD digital disks, RAM and ROM memories, computer hard drives and backup drives, external hard drives, "thumb" drives, and any other storage medium readable by a computer. The method or methods can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the method or methods. The method or methods may be implemented on a general-purpose microprocessor or on a digital processor specifically configured to practice the process or processes. When a general-purpose microprocessor is employed, the computer program code configures the circuitry of the microprocessor to create specific logic circuit arrangements. Storage medium readable by a computer includes medium being readable by a computer per se or by another machine that reads the computer instructions for providing those instructions to a computer for controlling its operation. Such machines may include, for example, machines for reading the storage media mentioned above.

A control sample or a reference sample as described herein can be a sample from a healthy subject. A reference value can be used in place of a control or reference sample, which was previously obtained from a healthy subject or a group of healthy subjects. A control sample or a reference sample can also be a sample with a known amount of a detectable compound or a spiked sample.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application, or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Development and Assessment of Adapt: Automated Volumetric Mammographic Density Assessment by Pixel Thresholding for Individual Breasts To develop and assess automated volumetric mammographic density assessment by pixel thresholding (ADAPT) for assessing breast density based on mammograms of one or both breasts, the following experiments were conducted.

Methods

Study Population

To assemble the study population 375 premenopausal women were recruited who were scheduled for annual screening mammography. Women were eligible if: (i) they were premenopausal at the time of the mammogram determined by having a regular menstrual period within the preceding 12 months, had no prior history of bilateral oophorectomy, and had not used menopausal hormone therapy, (ii) they possessed no serious medical condition that would prevent the participant from returning for her annual mammogram in 12 months, (iii) not pregnant, (iv) no history of any cancer, including breast cancer, (v) and no history of breast augmentation or reduction. At their screening mammogram appointments, participants completed a questionnaire on demographic characteristics and breast cancer risk factors. All study participants provided informed consent. The characteristics of these women are summarized in Table 1 below.

TABLE 1

Characteristics of 375 premenopausal women recruited to the RANK-Mammographic breast density study

| Characteristic | N | Mean ± SD/Percentage |
|---|---|---|
| Age (years) | 375 | 47.0 ± 4.8 |
| Age at first birth (years) | 302 | 26.0 ± 6.1 |
| Parity | | |
| Nulliparous | 70 | 18.8% |
| One | 67 | 18.0% |
| Two | 138 | 37.1% |
| Three or more | 97 | 26.1% |
| Family history of breast cancer | | |
| Yes | 87 | 23.2% |
| No | 275 | 73.3% |
| Unknown | 13 | 3.5% |
| Race | | |
| Non-Hispanic White | 246 | 65.6% |
| Black or African-American | 110 | 29.3% |
| Other/Unknown | 19 | 5.1% |
| Current BMI | 375 | 30.8 ± 8.1 |

Volpara (4th edition) was used to determine VPD, dense volume (DV), and non-dense volume (NDV). Volpara uses a computerized algorithm that calculates the X-ray attenuation at each pixel and converts the attenuation to an estimate of the tissue composition to create a density map and averages the cranialcaudal (CC) and mediolateral oblique (MLO) views of the left and right breasts.

Volumetric Percent Density Estimation

Herein, a computationally efficient method is proposed that automatically estimates the VPD, DV, and NDV, based on the pixel information provided by digital mammograms of all views (CC and MLO). The automated volumetric density assessment algorithm by pixel thresholding is referred to as ADAPT.

Figure 5A:
FIG. 5A is an original mammogram image.
Figure 5B:
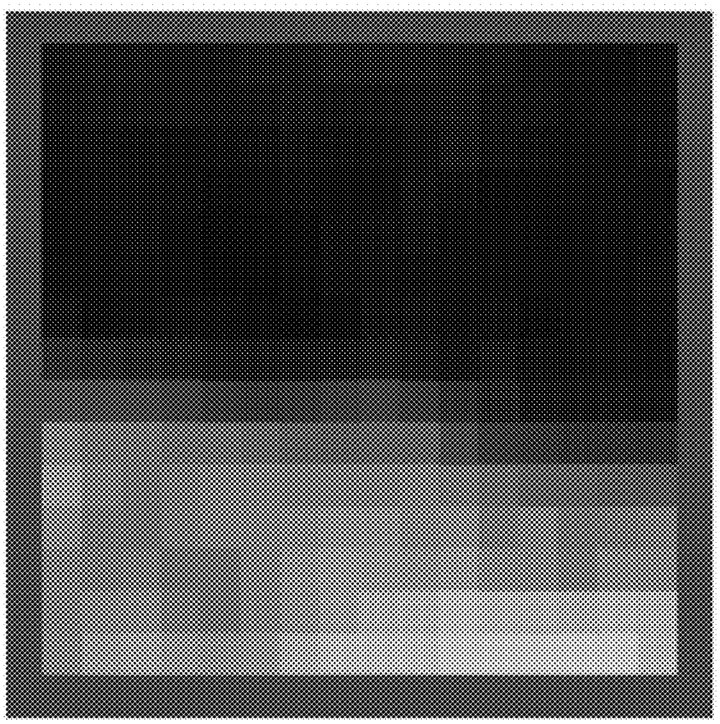
FIG. 5B is a magnified image of the area within the red box of the mammogram of FIG. 5A.

Essentially, the digital form of the mammogram and the corresponding pixel information can be gathered upon reading the digital mammograms. In the digital representation, each pixel point in the image corresponds to a gray-scale numerical value in the range of 0-255 (0 represents black, 255 represents white); see FIGS. 5A, 5B, and 5C as an example. Therefore, the brighter pixels will have higher numerical values compared to the darker pixels. With this background information, the VPD (either for an individual breast or averaged between both breasts), estimated as the fraction of DV over the total breast volume which is the sum of the DV and NDV, can be found by:

$$\frac{DV}{DV+NDV}*100\% = \text{volumetric percent density} \tag{1}$$

Figure 6B:
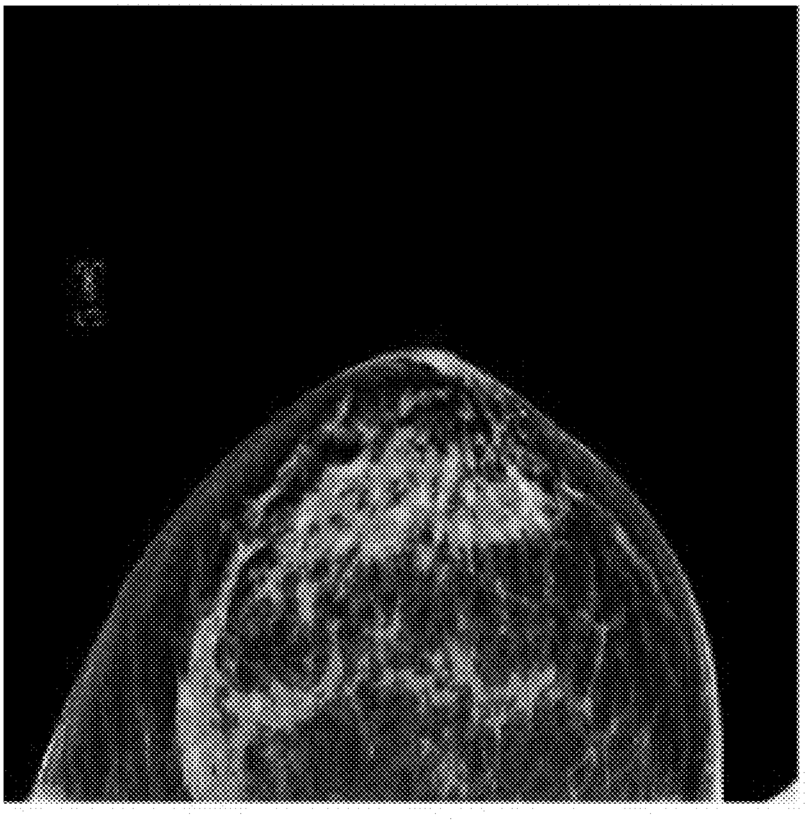
FIG. 6B is an image of an automated dense pixel identification (area embedded within the blue boundary) using ADAPT on the mammogram in FIG. 6A.
Figure 6A:
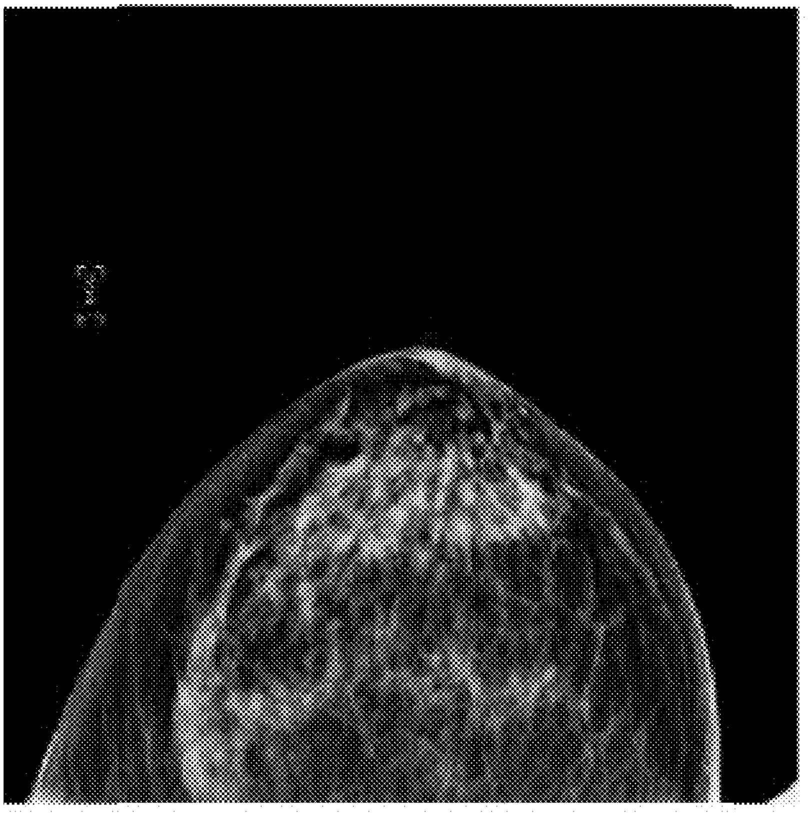
FIG. 6A is an original digital mammogram.

As the total breast volume is a fixed value in (1), the disclosed ADAPT focuses on the DV estimation with an automated pixel thresholding algorithm. Upon automated selection of a suitable threshold value, the pixels larger than this value are classified as dense. As an illustration, FIG. 6A shows the original mammogram and FIG. 6B shows the original mammogram overlaid with dense pixels (color) identified using ADAPT.

Mammogram Pre-Processing

Figure 7B:
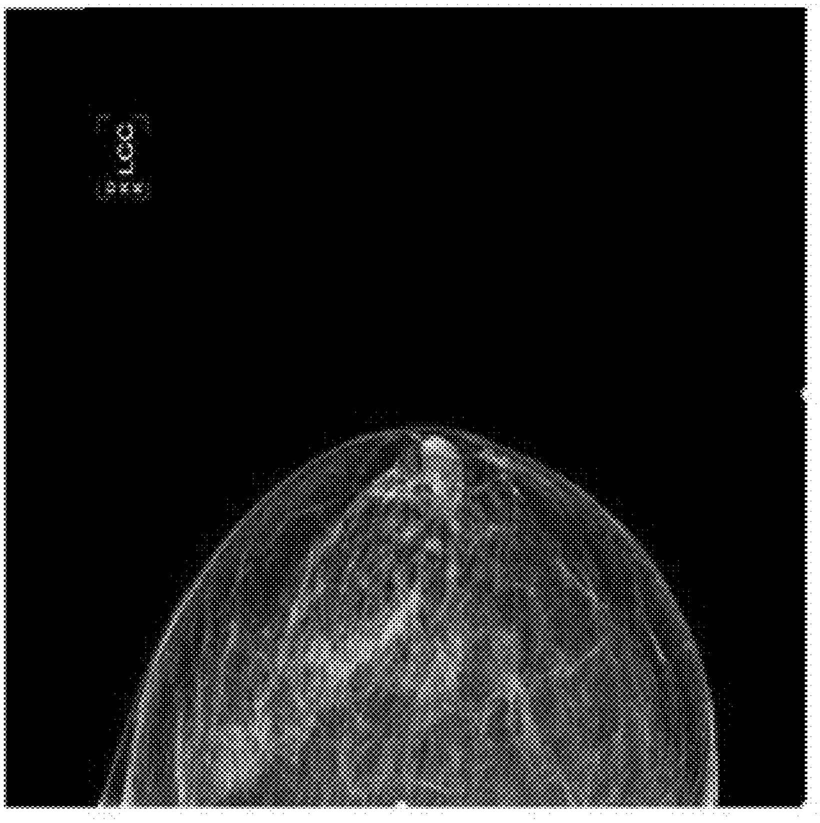
FIG. 7B is the mammogram image of FIG. 7A with a boundary detected by ADAPT superimposed.
Figure 7A:
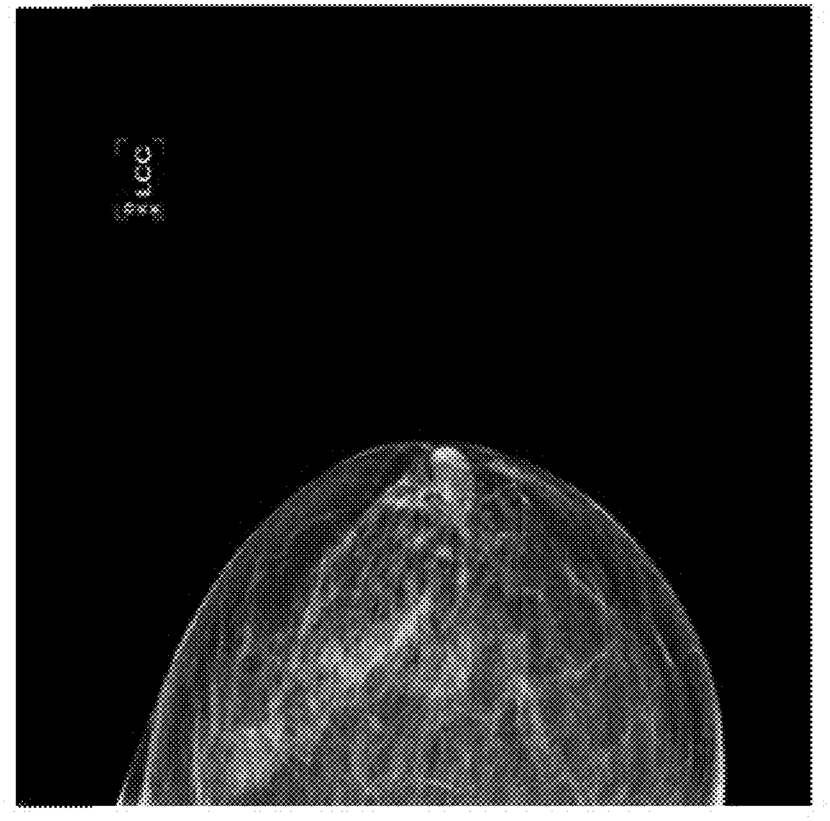
FIG. 7A is an original mammogram image.

Before the estimation of DV and NDV, the digital mammograms need to undergo some pre-processing that includes boundary (skin) removal for all CC/MLO views and pectoral muscle removal for MLO views. As shown in FIG. 7A, the edge of the breast appears to be very bright, which could be misclassified as dense breast tissue when performing the DV estimation. To eliminate this effect, this boundary is detected (see red contour I FIG. 7B) and excluded in the estimation procedure. This pre-processing has been implemented as part of the ADAPT pipeline.

Figure 8B:
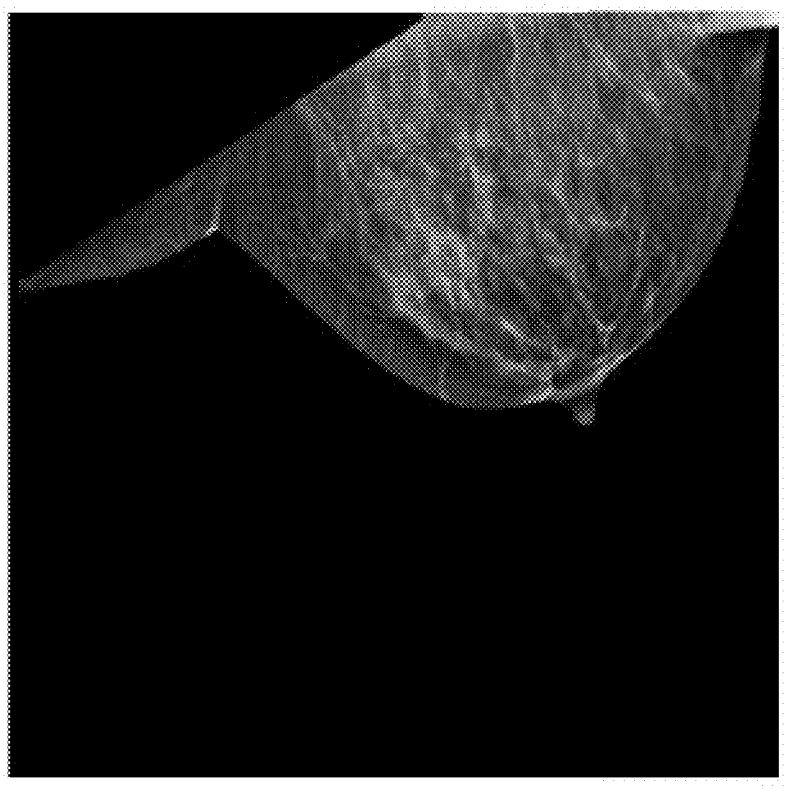
FIG. 8B is an image of the mammogram in FIG. 8A after removing detected pectoral muscle by ADAPT.
Figure 8A:
FIG. 8A is an original mammogram image with a boundary of a pectoral muscle detected by ADAPT superimposed.

Additionally, for the MLO views, the pectoral muscle detection algorithm has been implemented within the ADAPT pipeline. As shown in FIG. 8A, the pectoral muscle tissue also retains bright pixels, which will affect the delineation of the DV and VPD estimation. To ensure an unbiased estimate, the image contrast has been enhanced and then the iterative edge detection and removal algorithm was performed (see FIG. 8B).

Calibration

The ADAPT estimated average VPD has been calibrated with Volpara to ensure accurate estimation. Specifically, VPD estimated from ADAPT was used as the independent variable based on full-field mammograms processed with Hologic machines and it was regressed against VPD estimated from Volpara (4th edition) on the square root scale to ensure normality with a linear regression. In the regression framework, the deviation between ADAPT and Volpara estimated VPD can be assessed based on the c, where MSE close to O indicates a perfect fit. The Pearson coefficient, on the other hand, indicates the linear correlation between the two variables; a Pearson coefficient of 1 indicates a strong positive correlation. A fine grid of ADAPT thresholding values is then used in a 10-fold cross-validation in the calibration process to determine the threshold value that results in the smallest model-based MSE averaged over all folds. With the estimated averaged VPD calibrated with Volpara, the VPDs for the individual breasts are also outputted automatically with the pipeline.

Results

MSE and Pearson Correlation for Averaged VPD, DV, and NDV

To set a benchmark for our proposed pipeline, we first compare our ADAPT estimated average VPD, DV, and NDV from the two breasts using both the CC and MLO views with Volpara [version 1.5, (Matakina Technology Limited)].

Figure 9B:
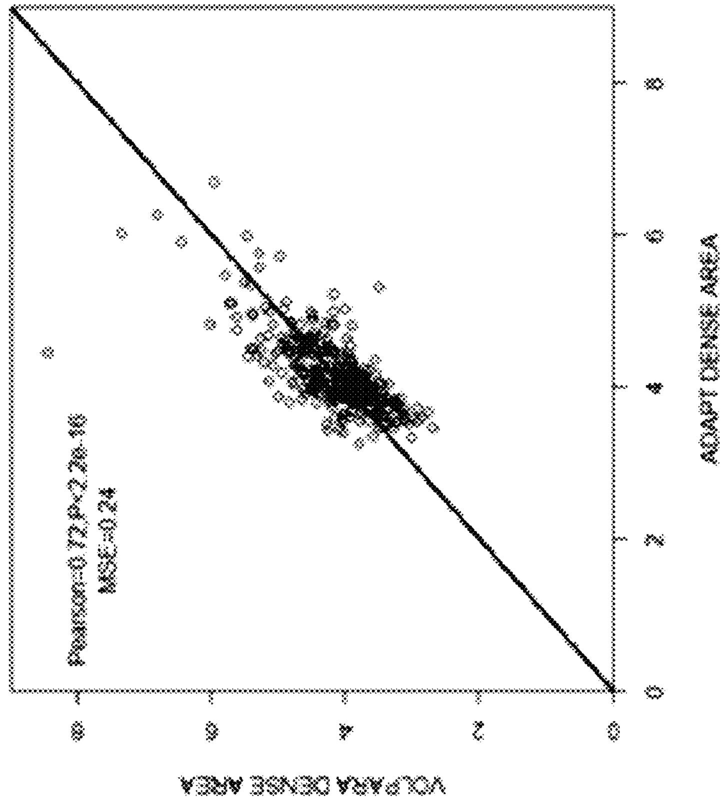
FIG. 9B is a linear correlation plot between ADAPT and Volpara for isometric transformed dense volume (DV).
Figure 9A:
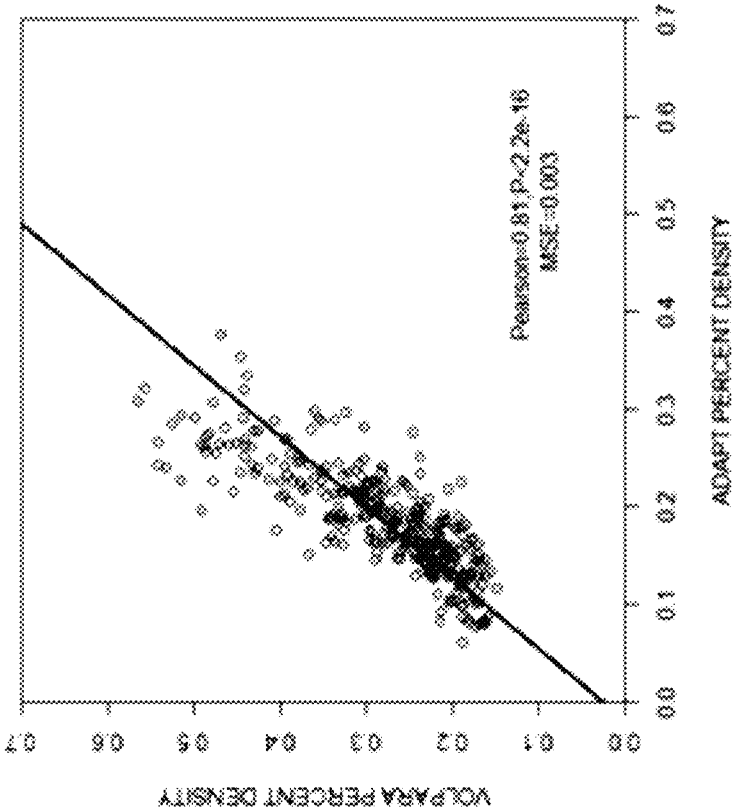
FIG. 9A is a linear correlation plot between ADAPT and Volpara for Volpara Percent Density (VPD) on the square root.

Based on the 10-fold cross-validation, the average MSE is estimated to be 0.003 between the proposed ADAPT and Volpara estimated VPD on the square root scale over all folds. There was a strong positive correlation between ADAPT-estimated VPD and Volpara as shown in FIG. 9A; the Pearson coefficient=0.81 (95% CI=[0.76, 0.84]).

Figure 9C:
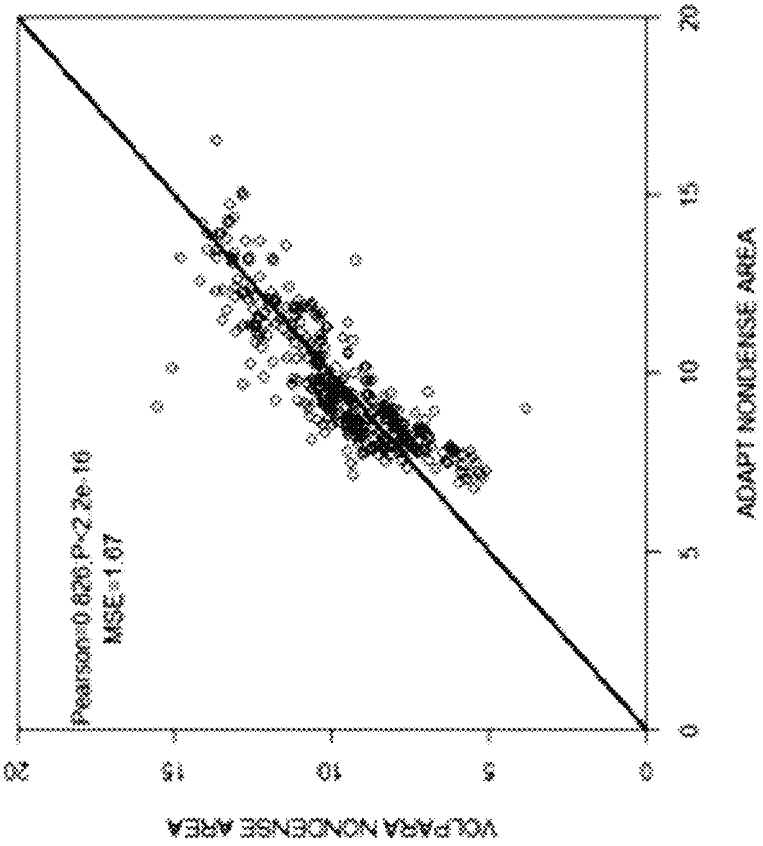
FIG. 9C is a linear correlation plot between ADAPT and Volpara for isometric transformed non-dense volume (NDV).
Figure 10A:
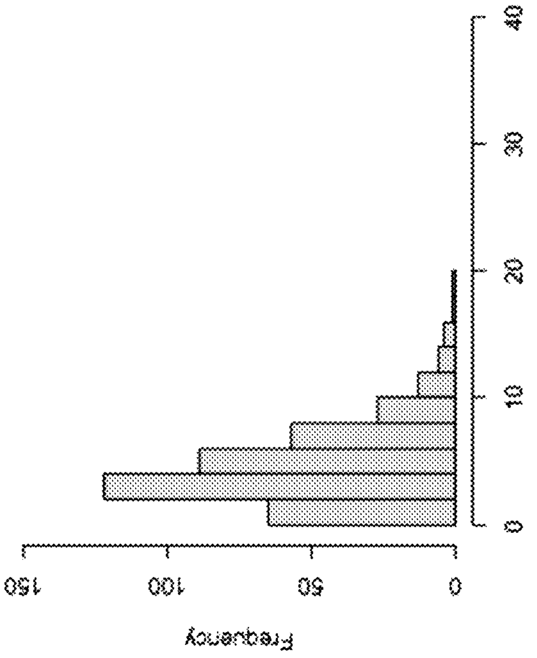
FIG. 10A is a histogram of the ADAPT estimated VPD distribution for the left breast in the craniocaudal (CC) view.
Figure 10C:
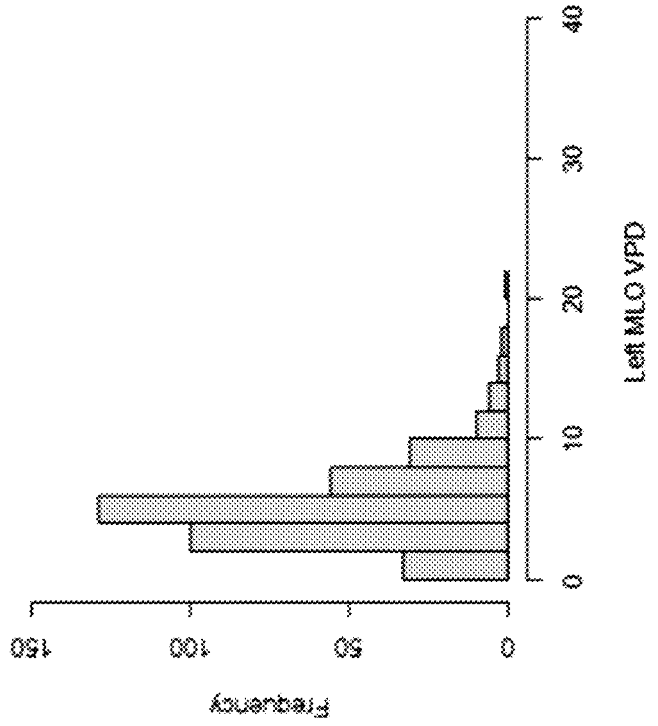
FIG. 10C is a histogram of the ADAPT estimated VPD distribution for the left breast in the mediolateral oblique (MLO) view.
Figure 10B:
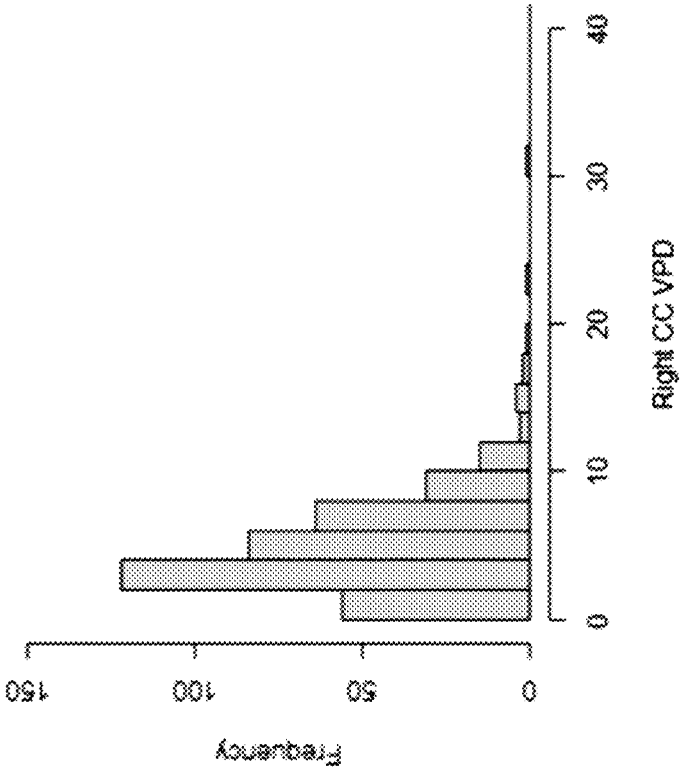
FIG. 10B is a histogram of the ADAPT estimated VPD distribution for the right breast in the craniocaudal (CC) view.
Figure 10D:
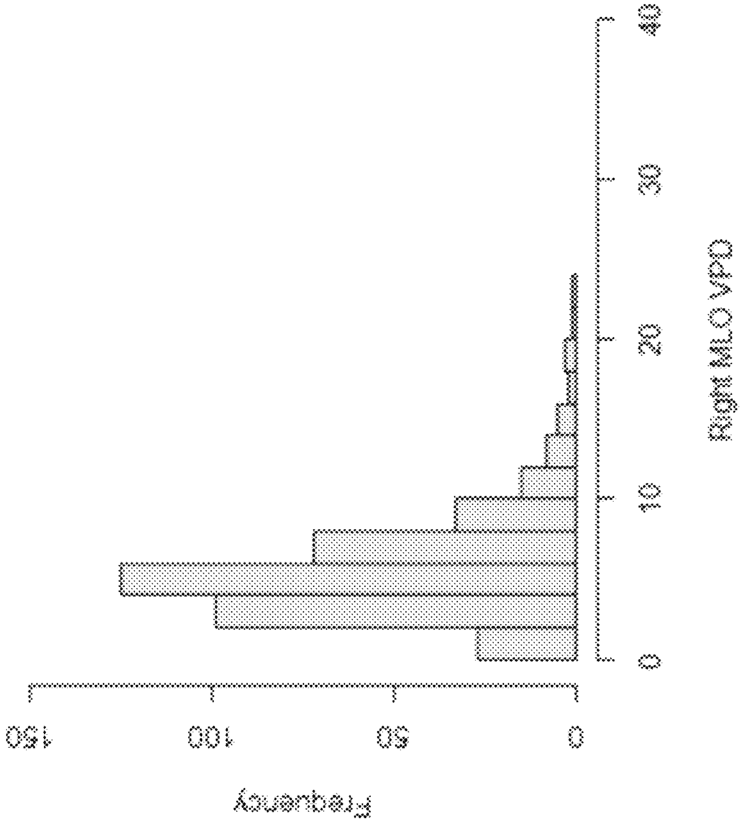
FIG. 10D is a histogram of the ADAPT estimated VPD distribution for the right breast in the mediolateral oblique (MLO) view.

To further validate the ADAPT pipeline, linear correlations between the ADAPT and Volpara estimates of DV and NDV have been evaluated. Because both the DV and NDV are on the absolute scale (as compared to the VPD expressed on a fraction scale), an isometric transformation was performed on both the ADAPT and Volpara values without changing the nature of the original data. As can be seen in FIGS. 9B and 9C, there is a strong positive linear association between both the ADAPT and Vol para estimated DV (Pearson coefficient=0.72, 95% CI=[0.67, 0.77]), and the NDV (Pearson coefficient=0.83, 95% CI=[0.79, 0.86]).

Distribution and Pearson Correlation for Individual Breast VPD, DV, and NDV

Figure 11A:
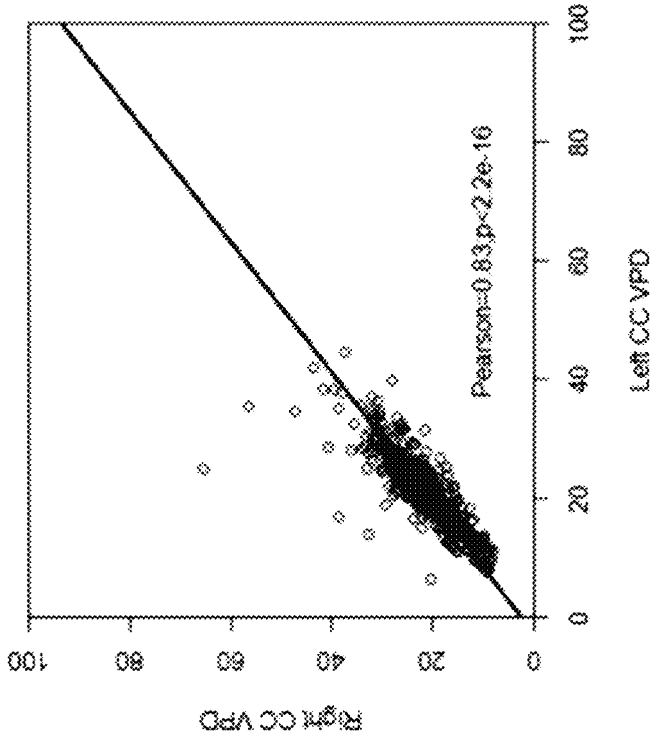
FIG. 11A is a Pearson correlation plot between left and right breasts in craniocaudal (CC) view.
Figure 11B:
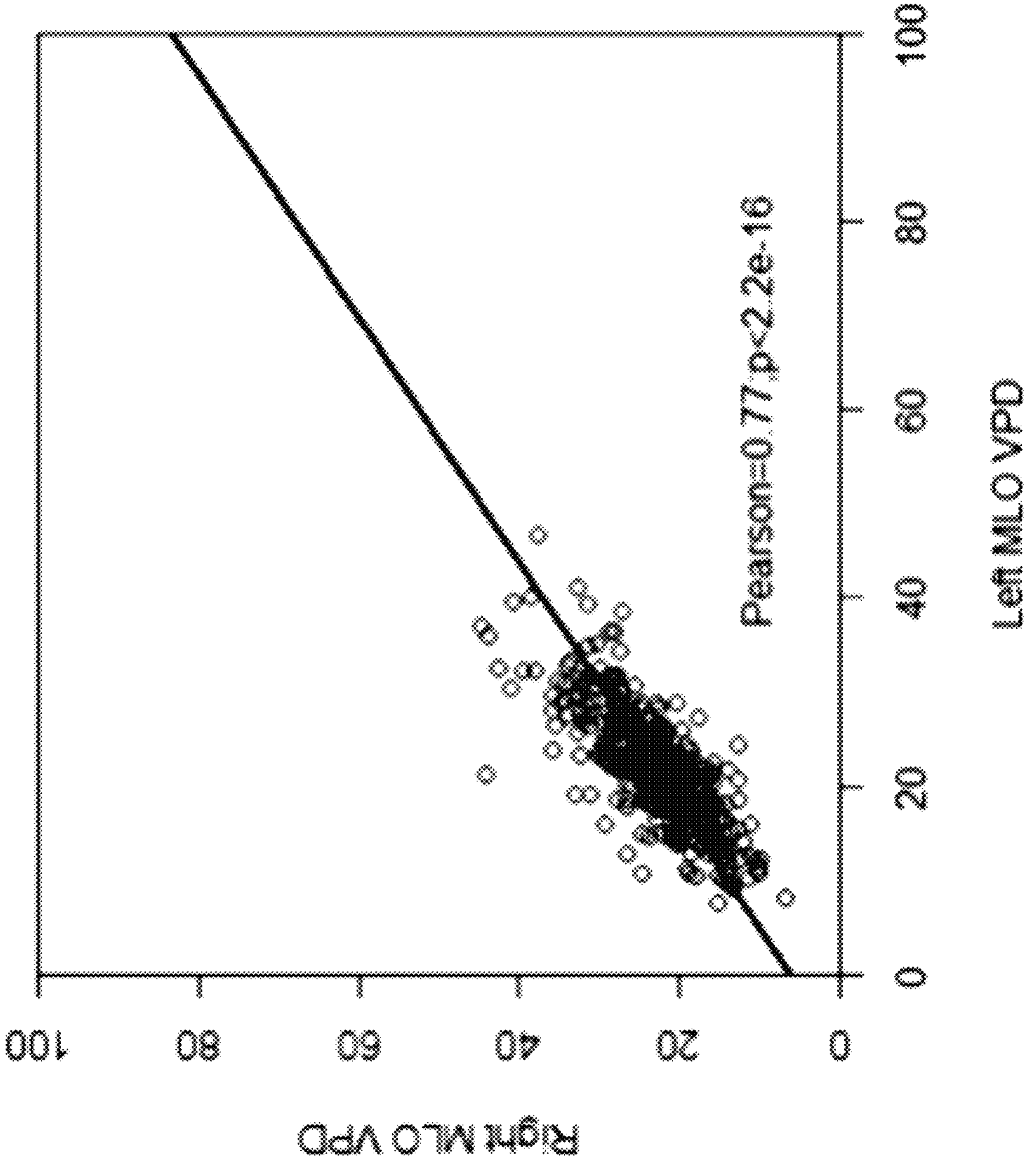
FIG. 11B is a Pearson correlation plot between left and right breasts in mediolateral oblique (MLO) view.

Given the strong concordance between ADAPT and Volpara in the estimation results for average VPD, DV, and NDV, the VPD distribution for individual breasts was then shown. FIGS. 10A, 10B, 10C, and 10D are histograms summarizing the VPD distributions for the left and right CC and MLO views estimated using ADAPT. These ADAPT estimated individual breast VPD measures range from 0.5% to <35% for the RANK cohort. The distribution of the CC and MLO VPDs for the left and right breast are similar at the baseline; this is in accordance with the literature. The correlation between the left and right breast for both the CC and MLO views is further given. As shown in FIGS. 11A and 11B, the Pearson correlation between the left and right breast for the CC view (FIG. 11A) is 0.83 (95% CI [0.79, 0.86]) and 0.77 (95% CI [0.72, 0.80]) for the MLO view (FIG. 11B).

Software

Figure 12A:
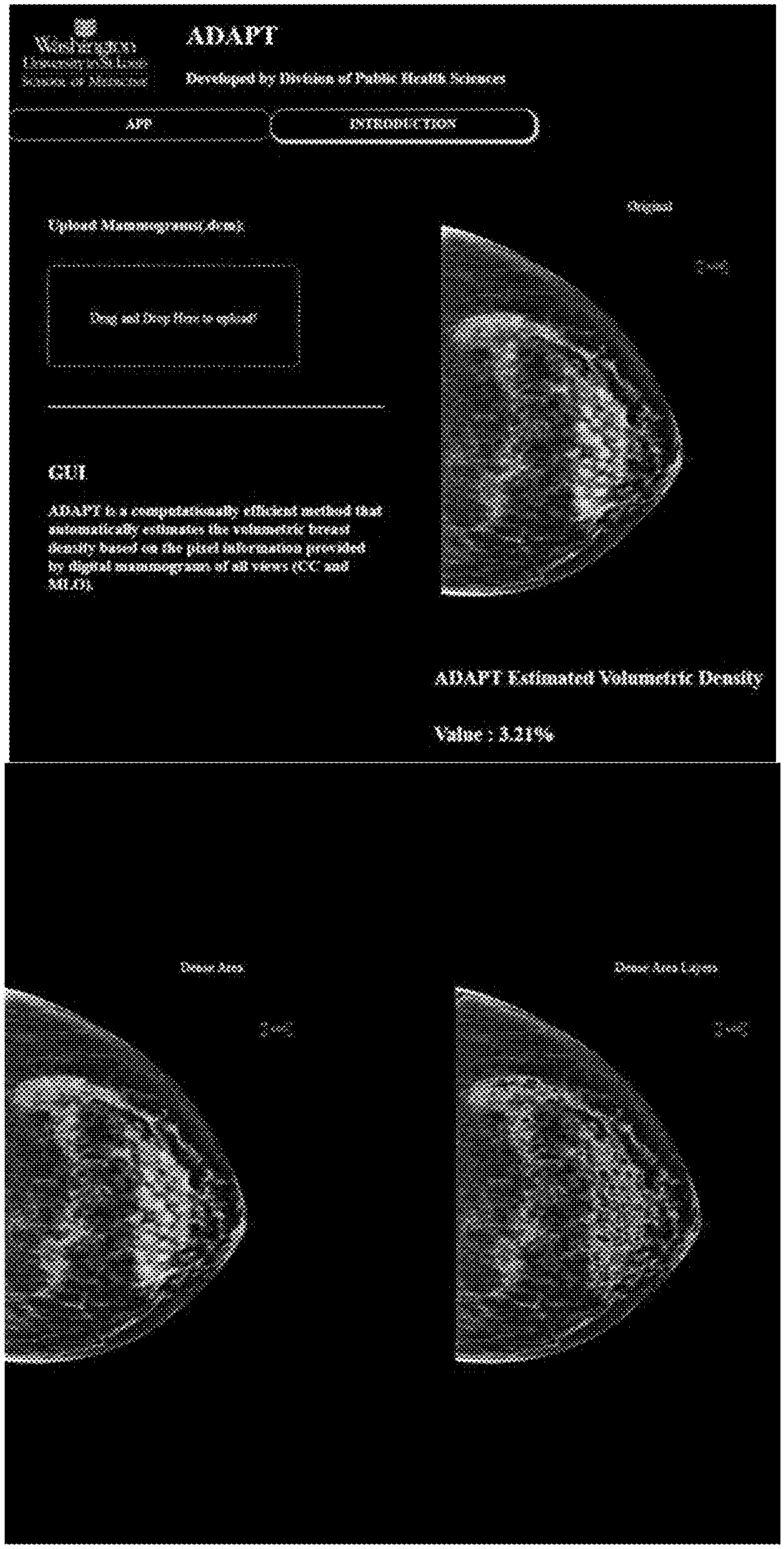
FIG. 12A is an image of the CC view ADAPT graphical user interface.
Figure 12B:
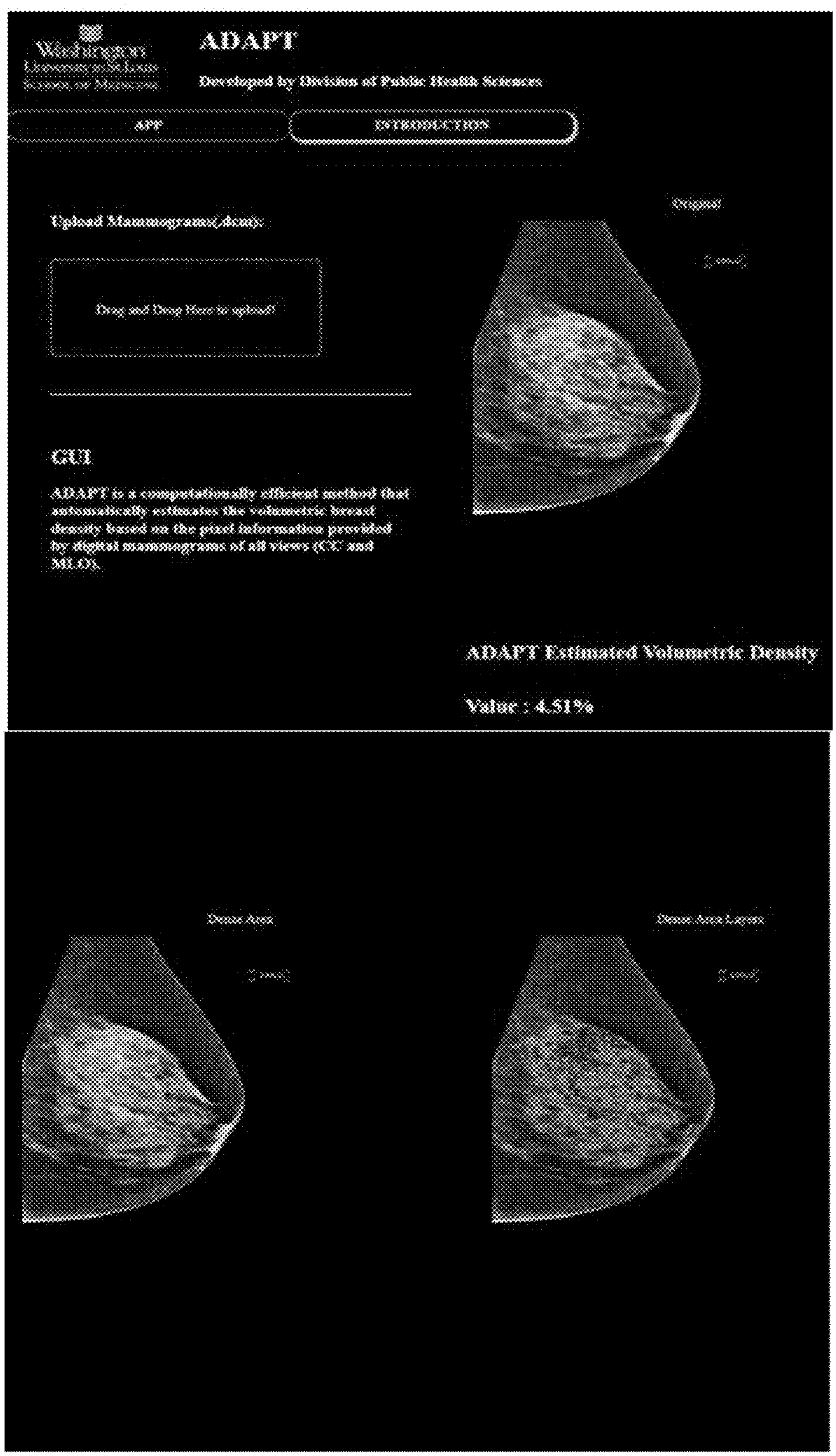
FIG. 12B is an image of the MLO view ADAPT graphical user interface.
Figure 13:
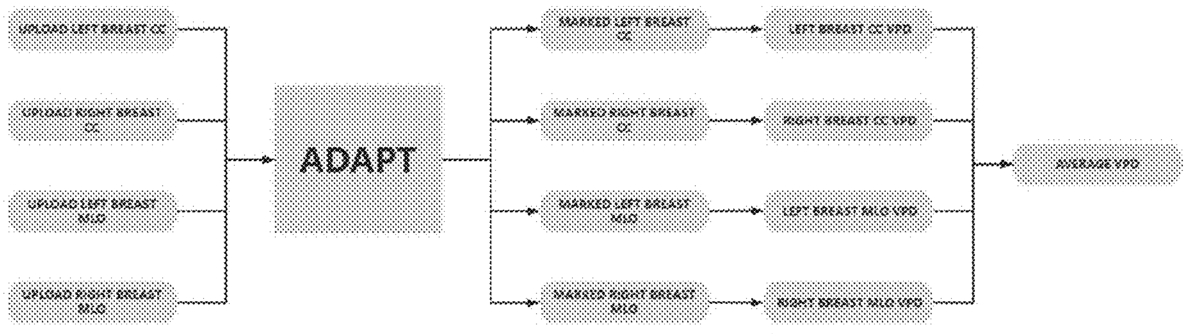
FIG. 13 is an ADAPT algorithm pipeline flow chart.

To align ADAPT with public and open usage, a graphical user interface (GUI) has been developed which embeds the ADAPT pipeline with instantaneous breast-specific VPD output. As illustrated in FIGS. 12A and 12B, the user can drag and drop all views of the mammogram in the original .dicom format, which will trigger the output of DV marking (green color) as well as layers of DV that vary by pixel threshold (i.e., dimmer to brighter) for all four views along with the individual breast VPD output. This algorithmic pipeline is shown in FIG. 13. The computational speed for VPD estimate and visualization output is <1 second on the platform which makes this feasible in real-time.

Example 2: Longitudinal Analysis of Breast-Specific Density Change Assessed by Digital Mammogram is Associated with Breast Cancer To determine if changes in volumetric breast density in the breast that will develop breast cancer can be identified before the detection of cancer in mammograms, the following experiments were performed. The results showed that longitudinal analysis of breast-specific density change assessed by digital mammogram is associated with breast cancer. Therefore, using repeated measures of density for each breast from digital mammograms, breast specific risk can be identified and earlier guidance for personalized risk reduction can be offered. Additional descriptions of these experiments are provided in Appendix B, the content of which is incorporated by reference herein in its entirety.

Methods

Description of Cohort

Figure 14:
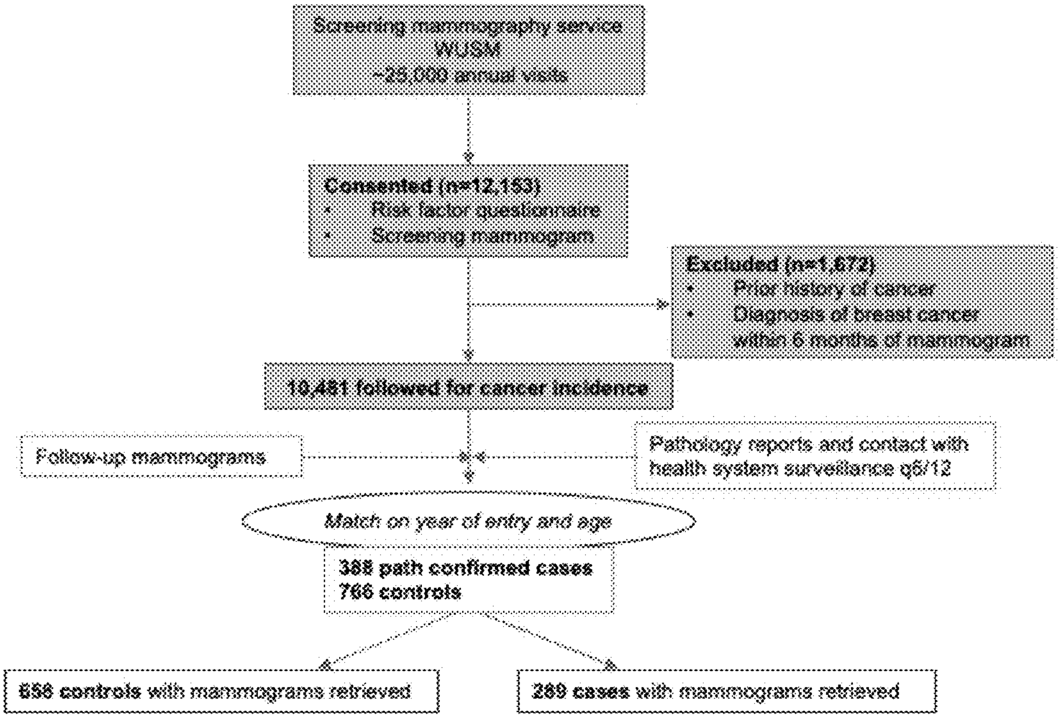
FIG. 14 is a flow chart of a study design used to develop and validate ADAPT.
Figure 15:
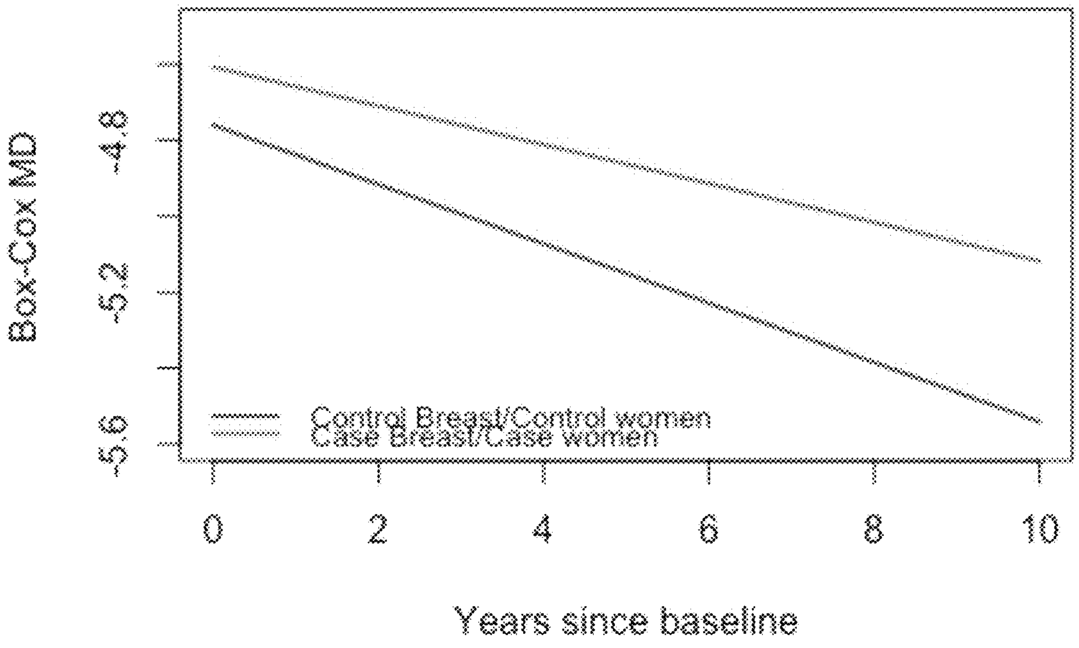
FIG. 15 is a graph of Box-Cox MD over time for positive and negative breast cancer patients.
Figure 16A:
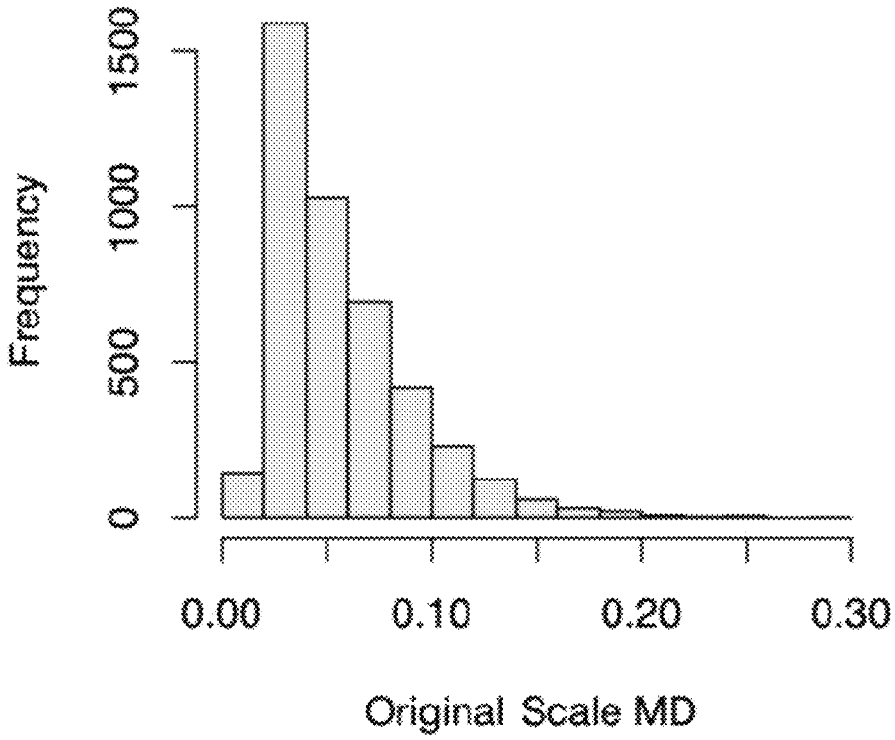
FIG. 16A shows a histogram of MD of two breasts on the original volumetric scale.
Figure 16B:
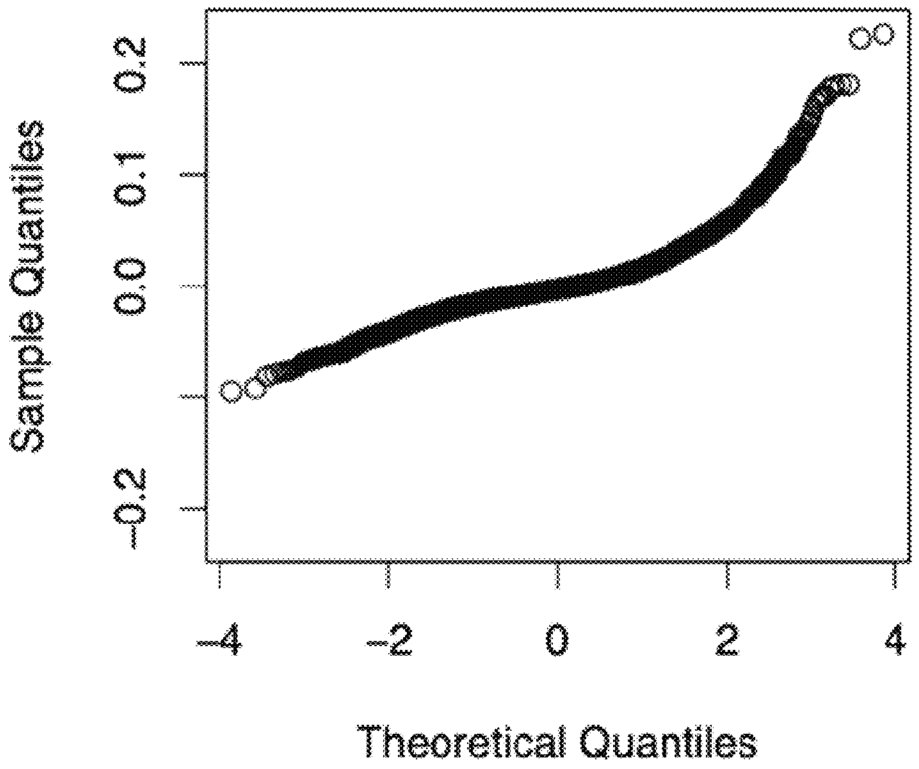
FIG. 16B shows a QQ plot for the normality of residuals corresponding to the histogram of FIG. 16A.
Figure 16C:
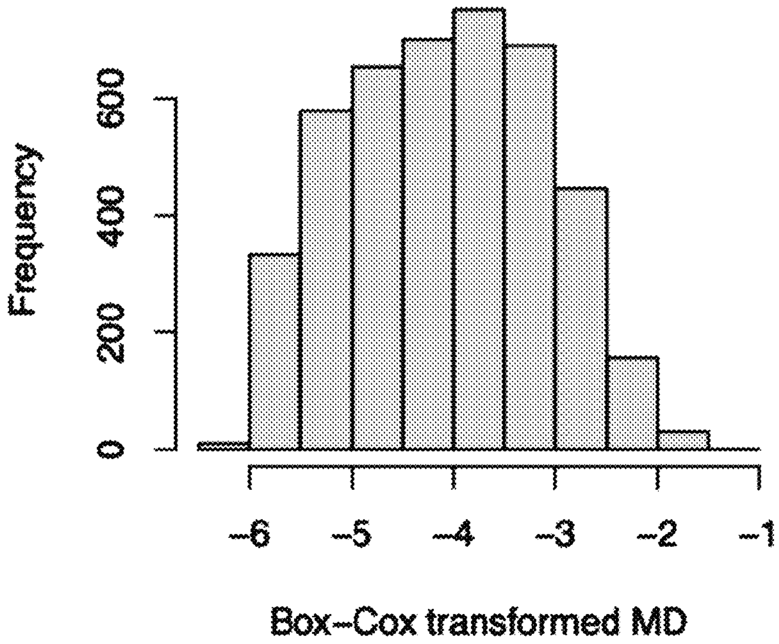
FIG. 16C shows a histogram of MD of two breasts on the of MD on the Box-Cox transformed scale.
Figure 16D:
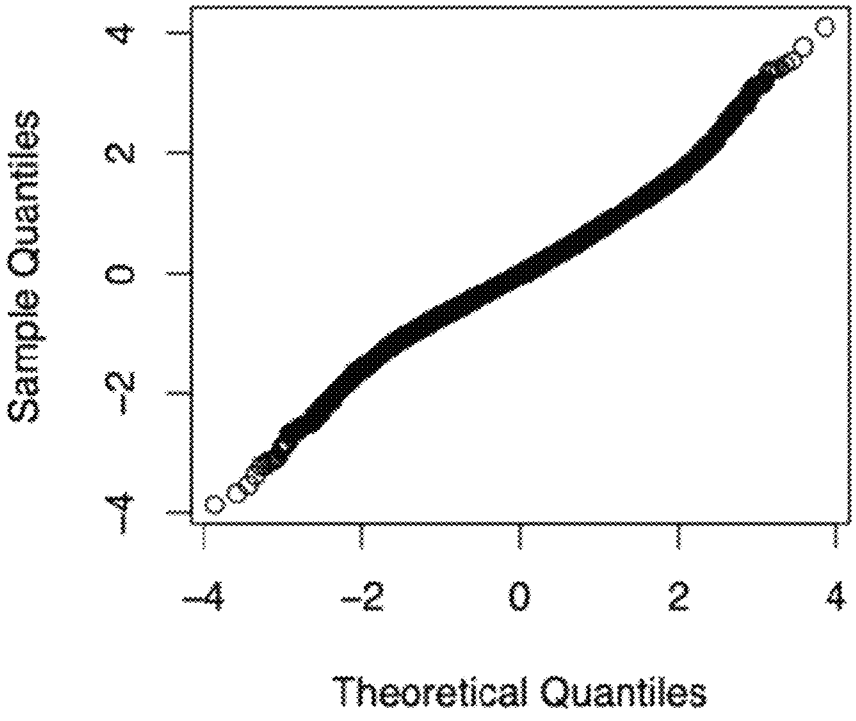
FIG. 16D shows a QQ plot for the normality of residuals corresponding to the histogram of FIG. 16C.

Women were recruited and consented to follow-up through a mammography service clinic as summarized in the flowchart of FIG. 14. This service was provided to women in the CDC and state-funded Breast and Cervical Screening programs, as well as uninsured women. As previously described, baseline questionnaire risk factors and screening mammograms were collected from 12,153 women. Of these, 1,672 were excluded for prior history of any cancer (except non-melanoma skin) or diagnosis of breast cancer within 6 months of registration for the study, for a total of 10,481 women.

Follow-up is through linking to electronic health records, tumor registry, and death register. Routine screening mammograms are collected every 1 to 2 years. Follow-up of cohort participants as determined by mammography and other clinic visits through December 2020 was: 78% seen in 2019 or 2020; a further 4.4% seen most recently in 2018 and a further 2.4% in 2017.14 All women remain under surveillance for return to follow-up mammography. Follow-up is passive through medical record linkages every 6 months, annual tumor registry searches, and annual mortality searches. This results in over 80% active follow-up for women seen within the last 36 months. The median number of mammograms is 5 (min=1, max=10) with a standard deviation (SD) of 2.43.

Risk factors used: Women self-reported breast cancer risk factors on entry to the cohort. These are drawn from established and validated measures. The baseline questionnaire assessed height, weight at age 18, current weight and weight at menopause, age at menarche, age at first birth, age at each subsequent birth, parity, menses ceased (yes/no), age at menopause (natural or with surgical removal of the uterus, with the removal of ovaries or without removal of ovaries), age at hysterectomy, family history of breast cancer (mother and/or sister), history of biopsy-confirmed benign breast tissues, current use of hormone therapy (yes/no), and type of hormone therapy, including duration, and current alcohol intake.

Percent mammographic density (MD) assessment. The volumetric percentage density within each digital CC-view mammogram is estimated with an automated pixel-thresholding algorithm implemented within ADAPT. The skin around the breast is automatically removed using a boundary detection algorithm prior to estimating the dense volume. The volumetric percent mammographic density (MD) is then estimated using the dense volume divided by the total breast volume which normalizes the difference in breast size across women. The correlation between the average volumetric MD generated from our automated algorithm with Volpara (4th edition) is 0.81 based on an out-of-sample study with 375 women from the RANK cohort with a mean age of 47 (SD=4.8).

Analytic Framework

To evaluate hypotheses, a linear mixed-effects model was fitted with separate records for each breast to accommodate longitudinal correlated continuous breast density data. A term for breast density in each breast is fitted representing density to evaluate differences between cases and controls at entry to cohort, and then an interaction with time for each breast to evaluate the second hypothesis of change in density varying over time (or repeated mammograms with aging) between breasts and the control women. With this model, correlations are accounted for within a woman between her two breasts and separately for density measured on the same breast over time. Box-Cox transformation was used to normalize the distribution of breast density and model checking and evaluation of residuals was performed (see FIGS. 16A, 16B, 16C, and 16D). In addition, to replicate standard practice we also report a conventional analysis using the average of density in the two breasts. More details are found in the next two method sections.

Linear Mixed Effects Model with Average MD Between Two Breasts

Let $Y_{ij}$ denote the average volumetric mammographic density (MD) between the left and right breast for individual i recorded at time $t_{ij}$, i=1, . . . , n; j=1, . . . , $J_i$. Let $X_i$ denote a length Q vector of baseline risk factors where age, BMI ($kg/m^2$), biopsy-confirmed history of benign breast disease, family history, alcohol, parity, and menopausal status are considered. If we let ($\delta_i$=1) denote the case of women who had breast cancer within the 10 years of follow-up in the cohort, we can construct the linear mixed effects model as, $$Y_{ij} = \beta_0 + \beta_1 I(\delta_i = 1) + \beta_2 t_{ij} + \beta_3 I(\delta_i = 1)t_{ij} + \alpha_1 X_{i1} + \ldots + \alpha_Q X_{iQ} + \gamma_1 X_{i1} t_{ij} + \ldots + \gamma_R X_{iR} t_{ij} + u_i + e_{ij}, \quad (1)$$

where it is assumed that we have Q baseline risk factors and R interactions with time, R≤Q. The average MD was transformed using the Box-Cox transformation to satisfy the normality assumption in the mixed effects model in accordance with the literature. The Box-Cox transformation is defined as a function of a power parameter λ, i.e., $Y=(Y^\lambda-1)/\lambda$ if λ≠0, and Y=log (Y) if λ=0. The estimation for the power parameter λ can be carried out with the R function boxcox. The estimated λ for our data using the average MD between two breasts is −0.18.

The time-invariant parameters are as follows: $\beta_0$ is the intercept that denotes the population average density over all time points, $\gamma_1$ is the comparison of density for case women vs. control women [($\delta_i$=0)] at baseline, $\alpha_1 \ldots \alpha_Q$ is the vector of coefficients of the baseline risk factors, $u_i$ is the random intercept for the ith woman, and $e_{ij}$ is the residual error. It is assumed that $u_i\sim(0, \sigma_u^2)$ and $e_{ij}$ are i.i.d. with mean 0 and variance $\sigma^2$. It is assumed that $u_i$ and $e_{ij}$ are mutually independent. Fixed effects are constant across women, whereas random effects vary across women. In the analysis, a random intercept for MD was fitted such that women starting or entering the cohort at different levels of breast density are accommodated. Other variables are considered as fixed effects.

The time-related parameters, on the other hand, are defined as follows: $\beta_2$ is the slope that denotes the change of MD over time in control women, i.e., the population level, and $\beta_3$ is the change in MD over time for case women. Here, it is noted that testing the following set of hypotheses, $$H_0: \beta_2 = 0 \text{ vs. } H_1: \beta_2 \neq 0 \quad (2)$$

enables one to assess whether the change in MD over time is significant in the population. On the other hand, testing the following, $$H_0:\beta_3 = 0 \text{ vs. } H_1:\beta_3 \neq 0 \tag{3}$$

enables one to assess whether the change of MD over time is significantly different between the cases and controls in the cohort.

Linear Mixed Effects Model with Breast-Specific MD of the Two Breasts

Instead of averaging MD between the two breasts, we can further investigate whether the longitudinal profile of the breast that goes on to develop breast cancer is different from the profile of the breast that does not, and from women who do not develop breast cancer during follow up can be further investigated. $Y_{ijk}$ denotes the Box-Cox transformed MD of the ith woman, taken at time $t_{ij}$, for the kth breast, k=1,2. The estimated λ for the data using MD in each breast is −0.26. An indicator variable with three levels is then constructed that corresponds to:

$$D_{ik}^{(1)} = I(ith \text{ woman is a control, } kth \text{ breast is a breast without breast cancer}); \tag{4}$$
$$D_{ik}^{(2)} = I(ith \text{ woman is a case, } kth \text{ breast is a breast without breast cancer});$$
$$D_{ik}^{(3)} = I(ith \text{ woman is a case, } kth \text{ breast is a breast that develops breast cancer}).$$

For any particular woman i, and any breast k, only one of these indicators can take on a value of 1, and the rest 0. As these indicators are assumed to be the observed event by the end of the follow-up, they do not have an indicator j. Similar to equation (1), a random-intercept mixed effects model is considered using $D_{ik}^{(1)}$ as the reference level:

$$Y_{ijk} = \beta_0 + \beta_1 t_{ij} + \beta_2 D_{ik}^{(2)} + \beta_3 D_{ik}^{(3)} + \beta_4 D_{ik}^{(2)} t_{ij} + \beta_5 D_{ik}^{(3)} t_{ij} + \alpha_1 X_{i1} + \ldots + \alpha_Q X_{iQ} + \gamma_1 X_{i1} t_{ij} + \ldots + \gamma_R X_{iR} t_{ij} + u_i + e_{ij}, \tag{5}$$

where three types of correlations have been accounted for: (i) the cross-sectional inter-breast correlation; (ii) the longitudinal correlation among repeated measures in the same breast over time; and (iii) the cross-correlation between the MD of one breast at one time point and the MD for the contralateral breast at a different time point.

As such, testing the following set of hypotheses, $$H_0:\beta_2 = 0 \text{ vs. } H_1:\beta_2 \neq 0 \tag{6a}$$

enables us to assess whether the breast without breast cancer within the case of women patients is different from the control women at baseline. On the other hand, testing the following, $$H_0:\beta_4 = 0 \text{ vs. } H_1:\beta_4 \neq 0 \tag{6b}$$

enables one to assess whether the change for breast without breast cancer within the case of women patients is different from the control women.

Further, testing the following set of hypotheses, $$H_0:\beta_3 = 0 \text{ vs. } H_1:\beta_3 \neq 0 \tag{7a}$$

enables one to assess whether the breast that develops breast cancer within the case women is different from the control women at baseline. Similarly, testing for $$H_0:\beta_5 = 0 \text{ vs. } H_1:\beta_5 \neq 0 \tag{7b}$$

enables us to assess whether the change for breasts that develop breast cancer within the case of women patients is different from the control women.

Estimation

Both linear mixed-effects models were fitted using the existing R package lmer.

Model Checking

Figure 23A:
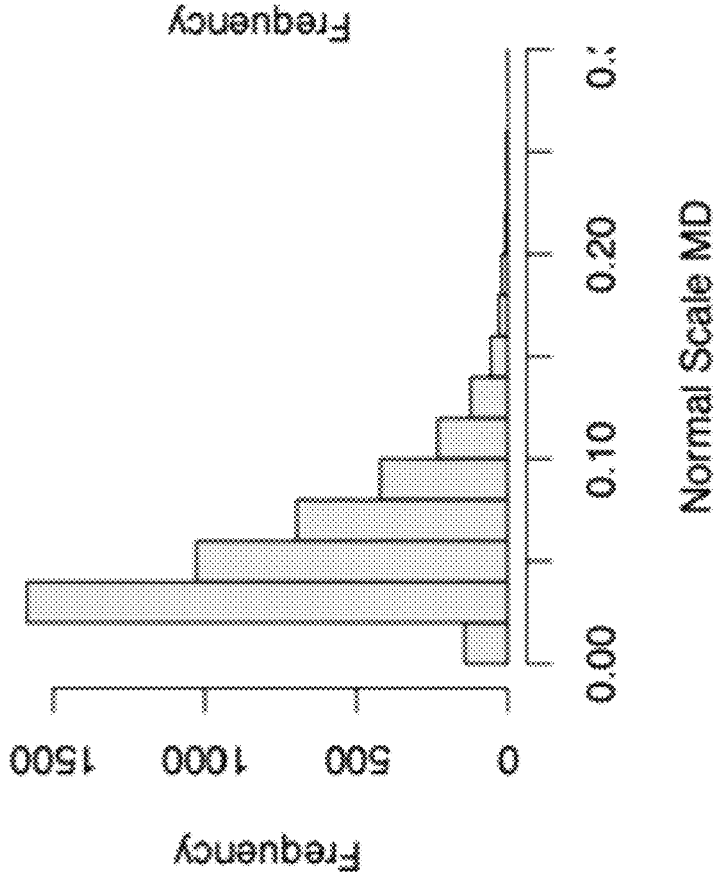
FIG. 23A is a histogram of MD averaged between the two breasts on the normal scale.
Figure 23B:
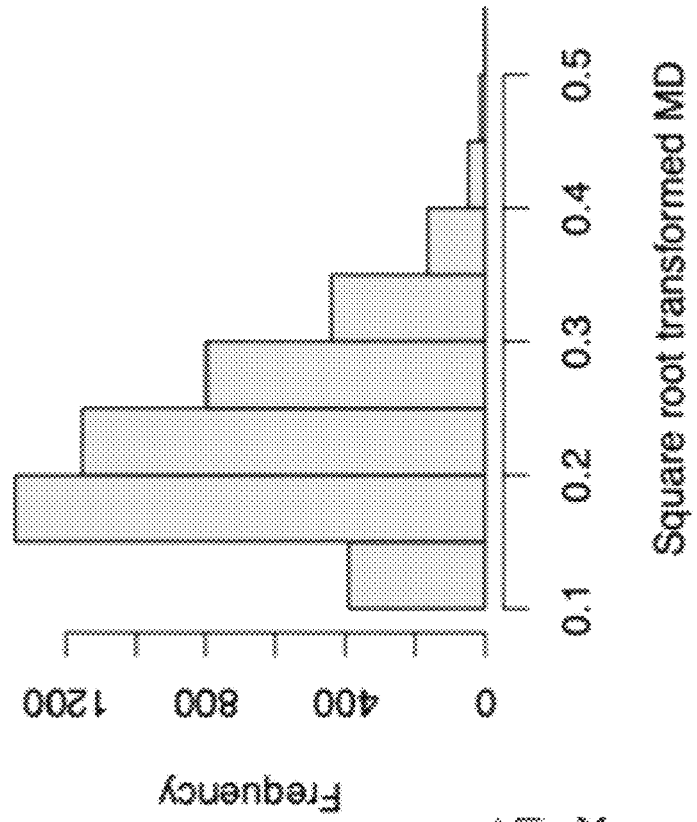
FIG. 23B is a histogram of MD averaged between the two breasts on the square-root scale.
Figure 23D:
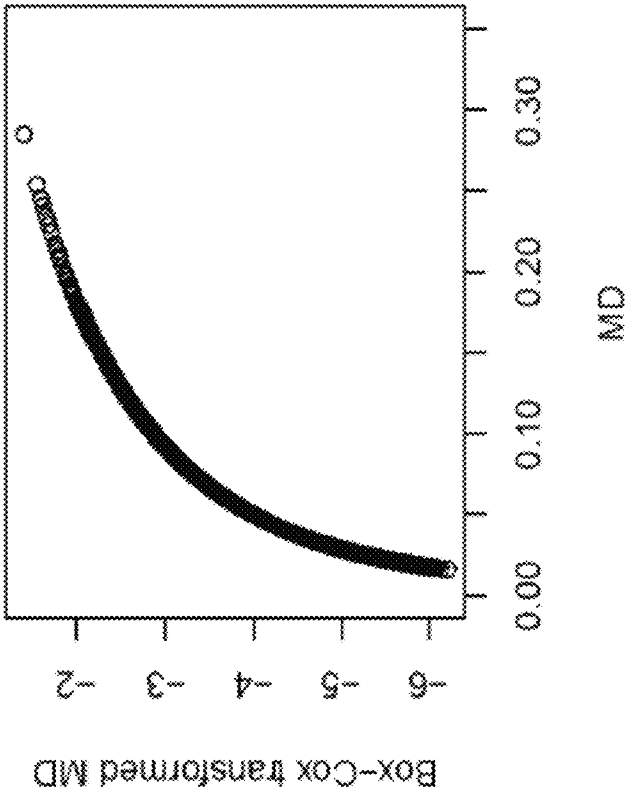
FIG. 23D is a scatter plot of Box-Cox transformation vs. normal scale MD.
Figure 23C:
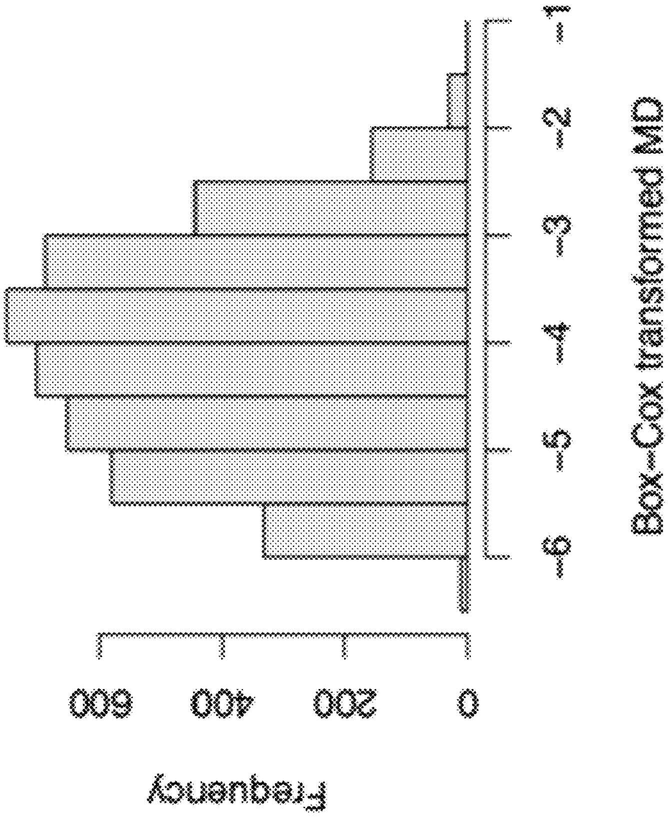
FIG. 23C is a histogram of MD averaged between the two breasts on the Box-Cox transformed scale.
Figure 24A:
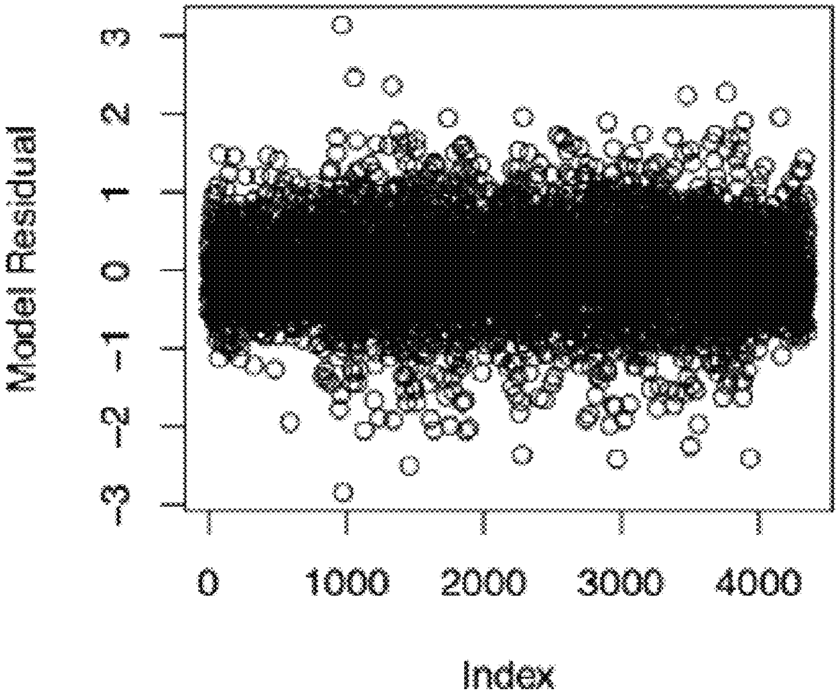
FIG. 24A is a graph of the model checking for the linear mixed effects for averaging MD between two breasts for homogeneity of the residual variance.
Figure 24B:
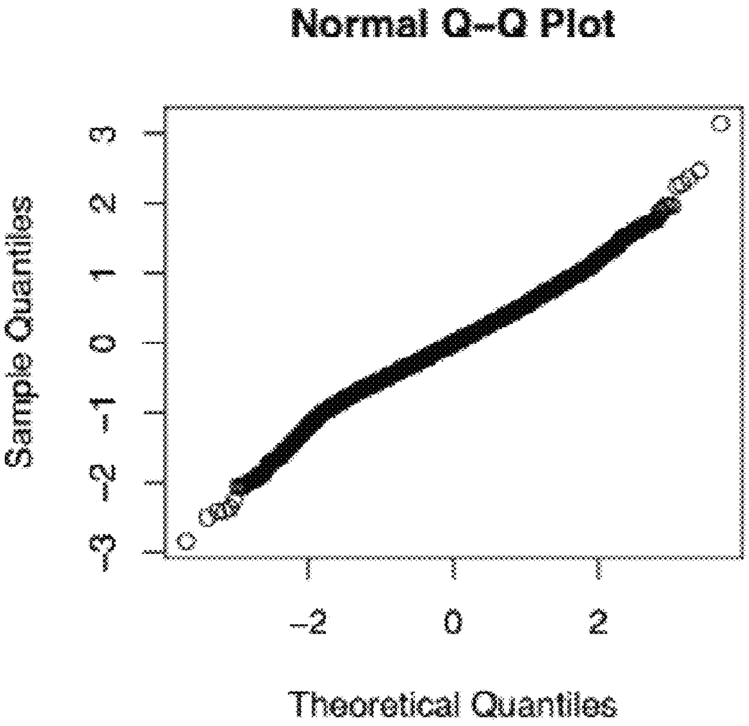
FIG. 24B is a graph of the model checking for the linear mixed effects for averaging MD between two breasts for the normality of residuals.
Figure 25A:
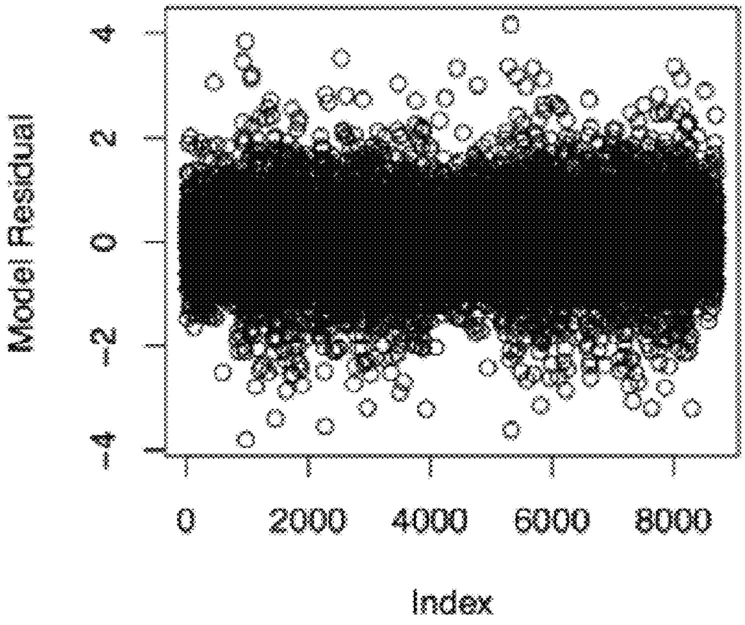
FIG. 25A is another graph of the model checking for the linear mixed effects for averaging MD between two breasts for homogeneity of the residual variance.
Figure 25B:
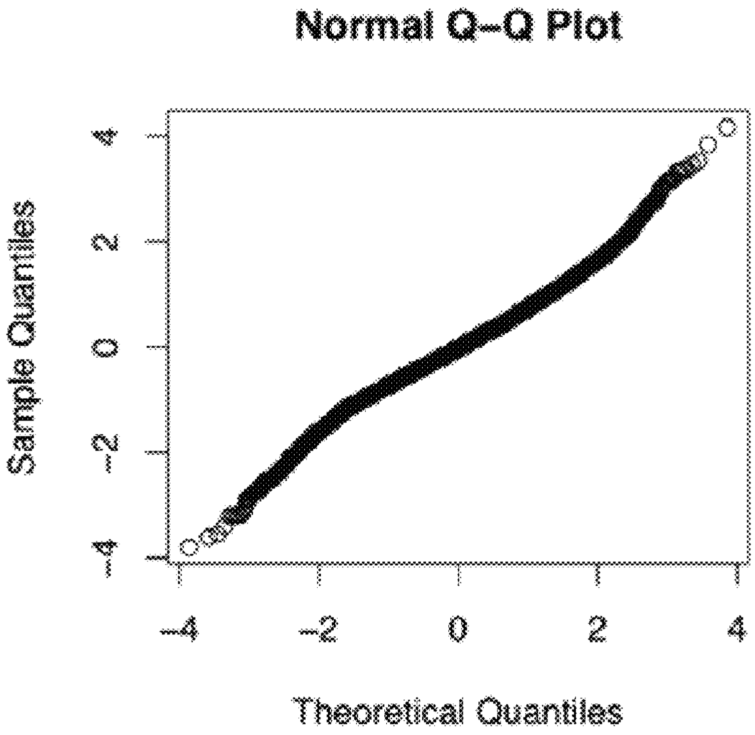
FIG. 25B is another graph of the model checking for the linear mixed effects for averaging MD between two breasts for the normality of residuals.

Justification and illustration for using the Box-Cox in comparison to the square-root transformation are demonstrated in FIGS. 23A, 23B, and 23C. The normality of the data is further improved with the Box-Cox transformation, moving away from the right skewed MD distribution. A scatter plot of Box-Cox transformation vs. MD is also illustrated in FIG. 23D. Further, we performed a test of assumptions for all linear mixed-effects models described in the current disclosure. This includes testing for the homogeneity of residual variance and the normality of residuals. See FIGS. 24A, 24B, 25A, and 15B for these plots. All results that use the term 'MD' in the following subsections refer to the Box-Cox transformed MD.

Results

Figure 18:
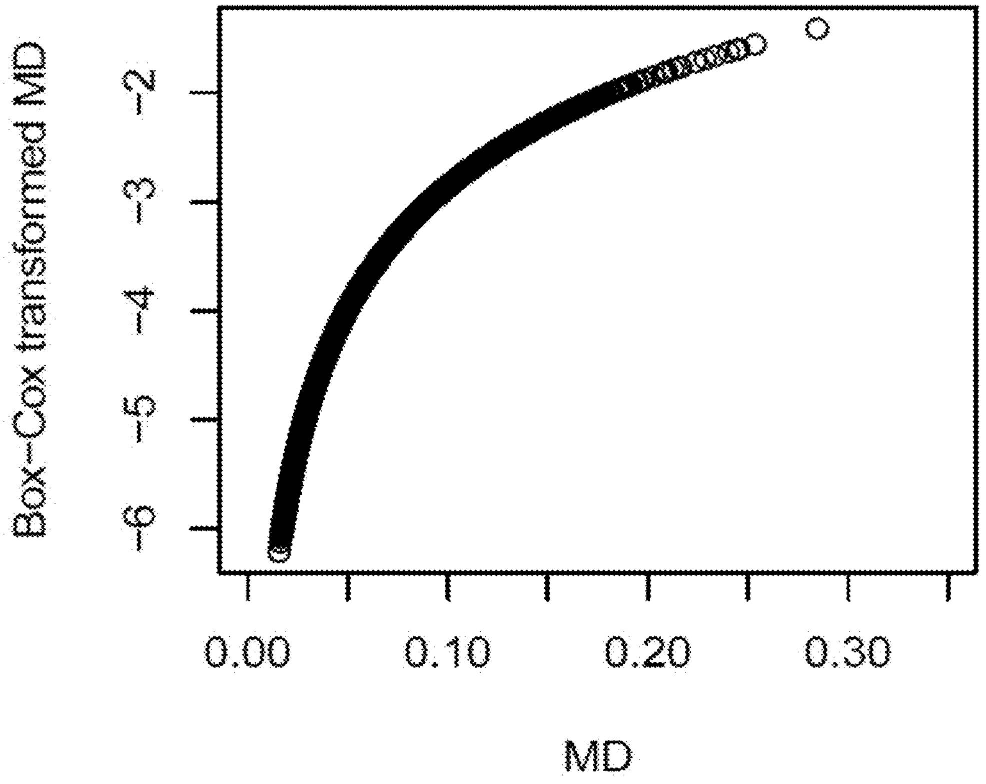
FIG. 18 is a scatter plot of Box-Cox transformation vs. original scale MD.
Figure 19:
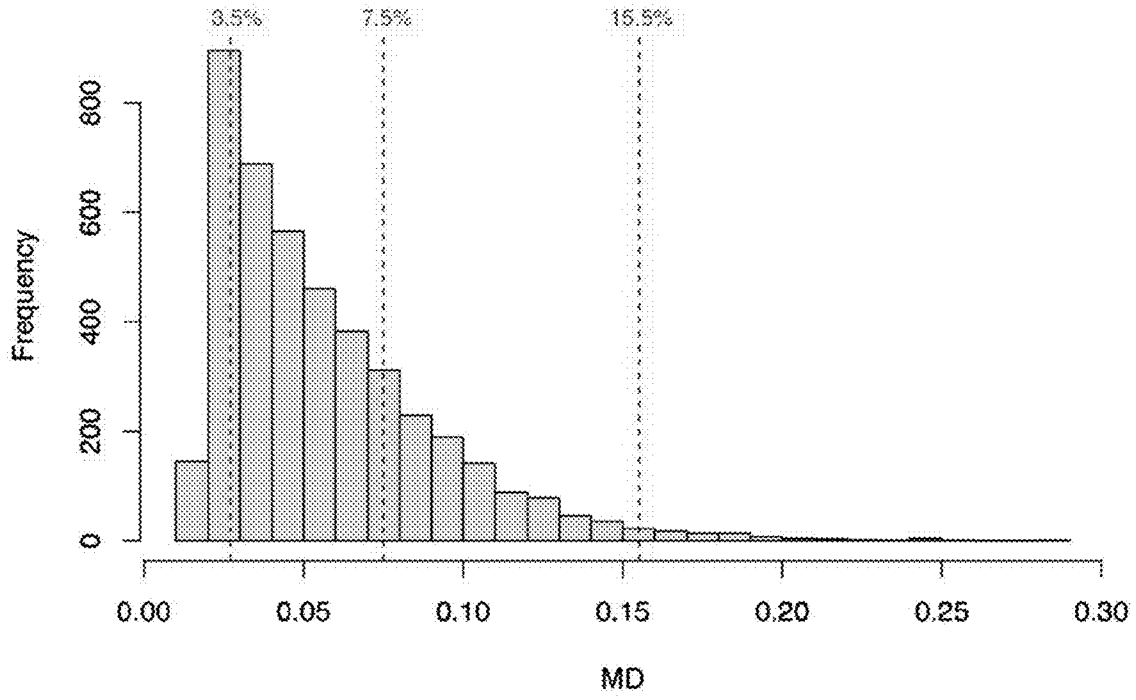
FIG. 19 is a histogram with volumetric cut points for the original scale MD to BI-RADS levels. Corresponding to the Breast Imaging Reporting and Data System categorical terms (5th edition), these percentages translate to (a) <3.5%; (b) ≥3.5 and <7.5%; (c) ≥7.5 and <15.5%; and (d) ≥15.5%.
Figure 20A:
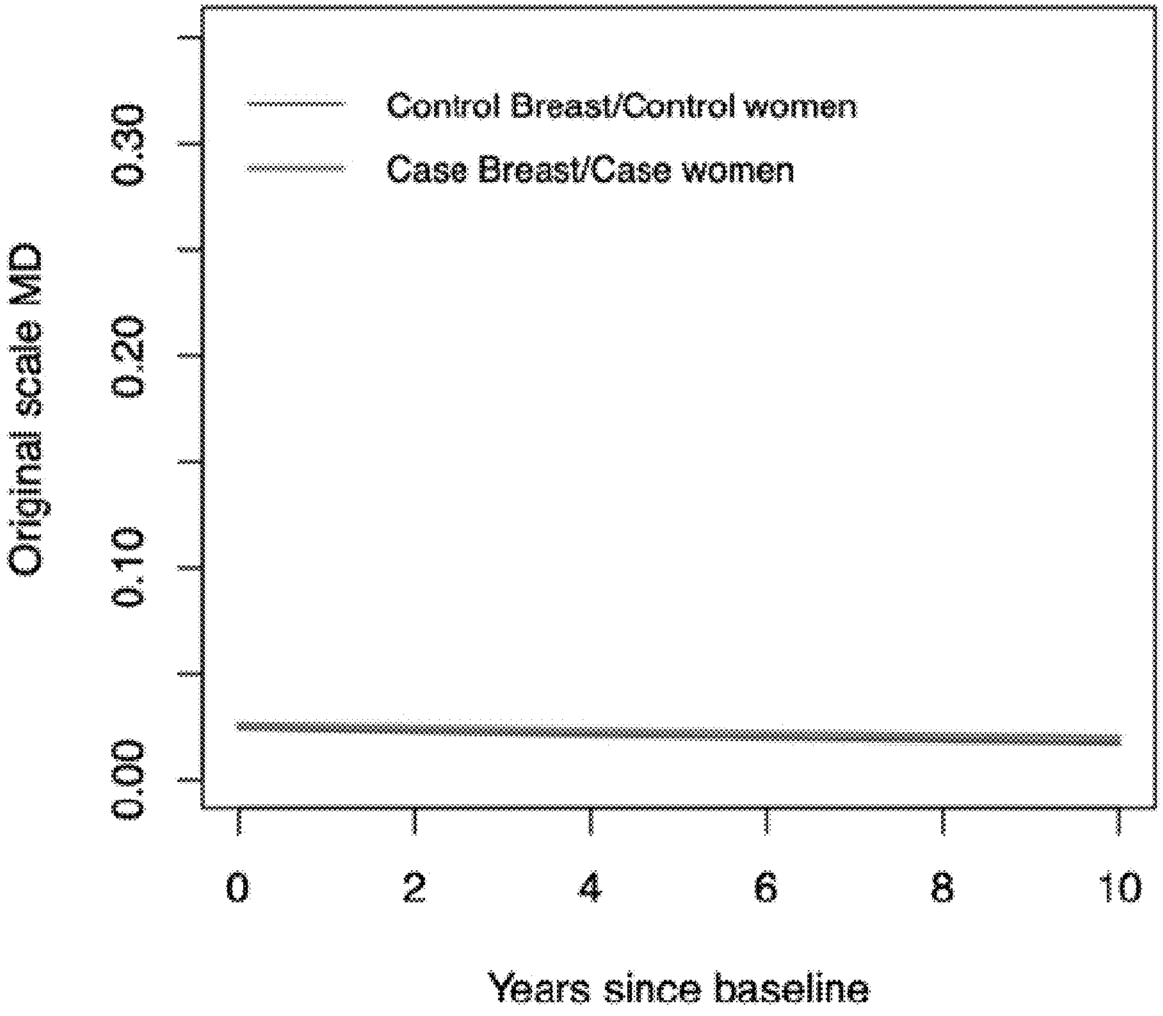
FIG. 20A is a graph of changes in MD expressed in original volumetric percent scale stratified by BI-RADS A (MD<3.5%) for the case breast in the case of women and control women over time.
Figure 20B:
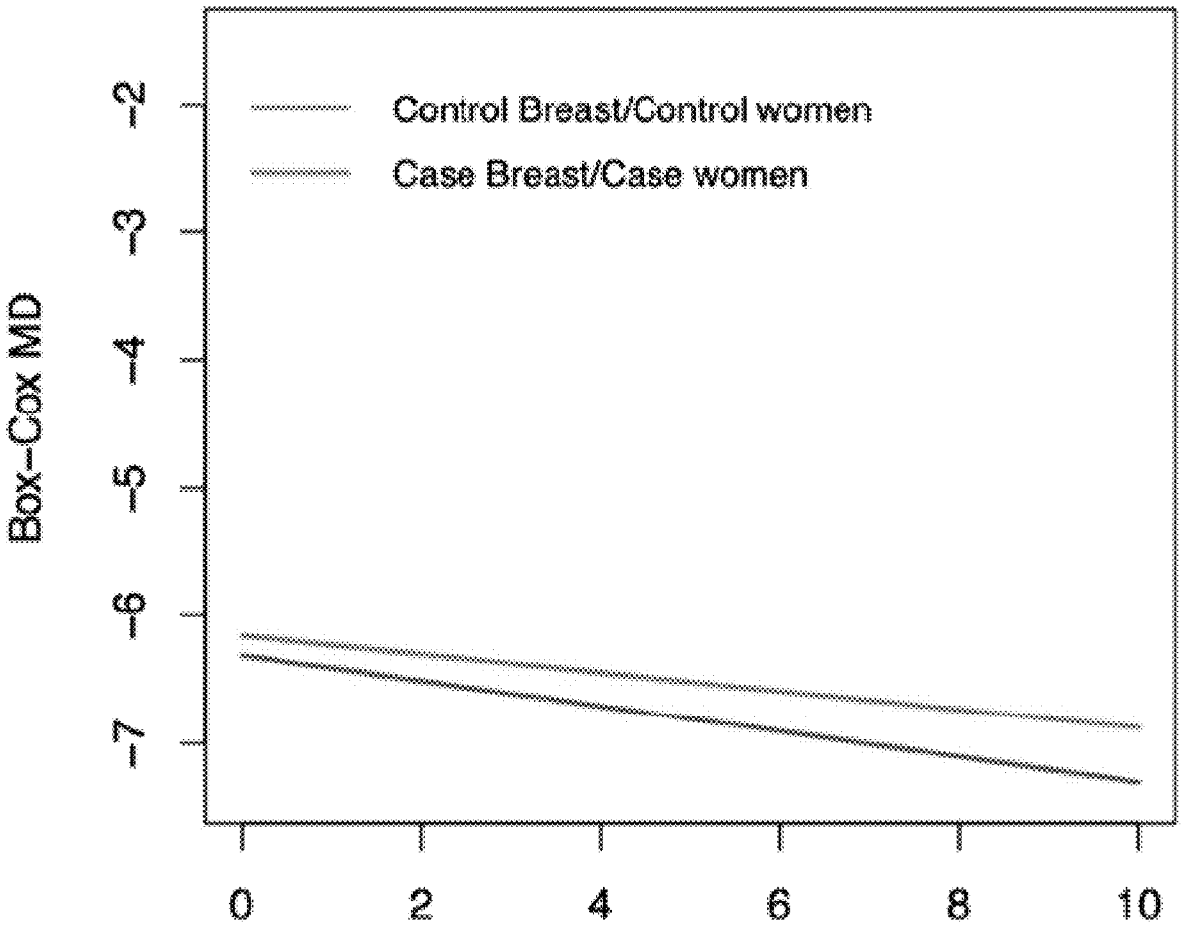
FIG. 20B is a graph of changes in MD expressed in Box-Cox transformed scale stratified by BI-RADS A (MD<3.5%) for the case breast in the case of women and control women over time.
Figure 20C:
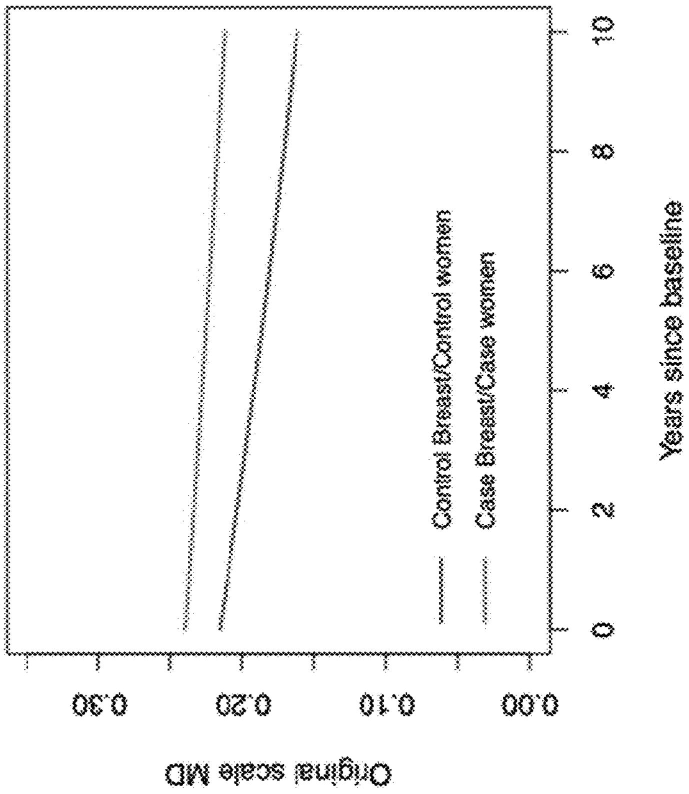
FIG. 20C is a graph of changes in MD expressed in original volumetric percent scale stratified by BI-RADS D (MD>15.5%) for the case breast in the case women and control women over time.
Figure 20D:
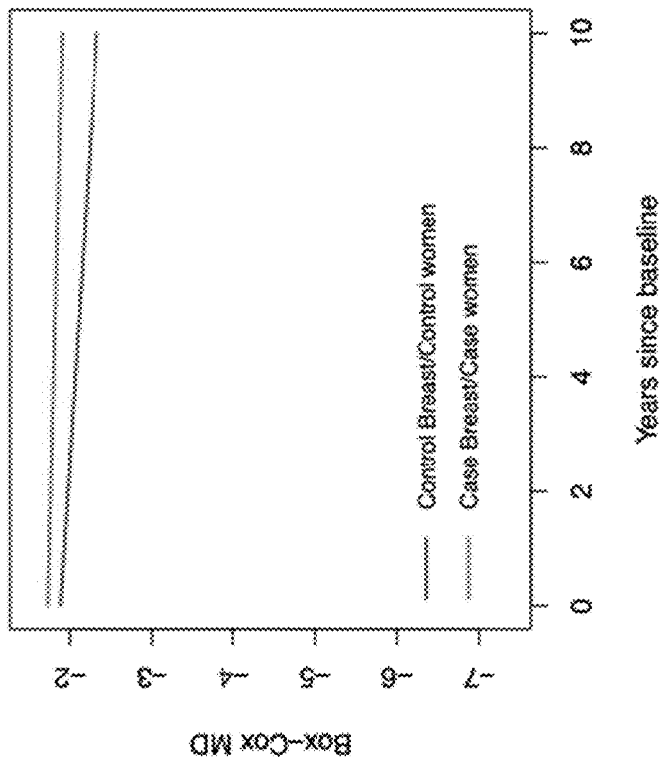
FIG. 20D is a graph of changes in MD expressed in Box-Cox transformed scale stratified by BI-RADS D (MD>15.5%) for the case breast in the case of women and control women over time.
Figure 21:
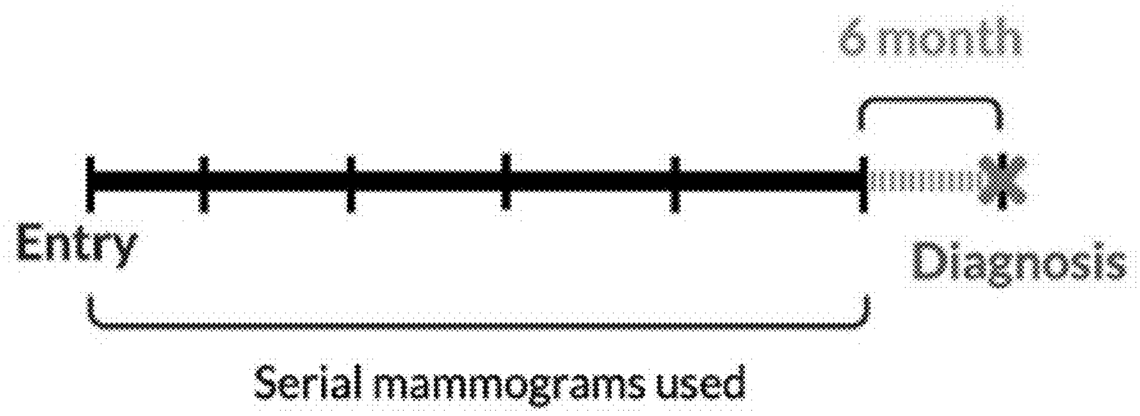
FIG. 21 is a schematic overview of the timeline used in the ADAPT analysis that excludes mammograms within 6 months prior to breast cancer diagnosis.
Figure 22:
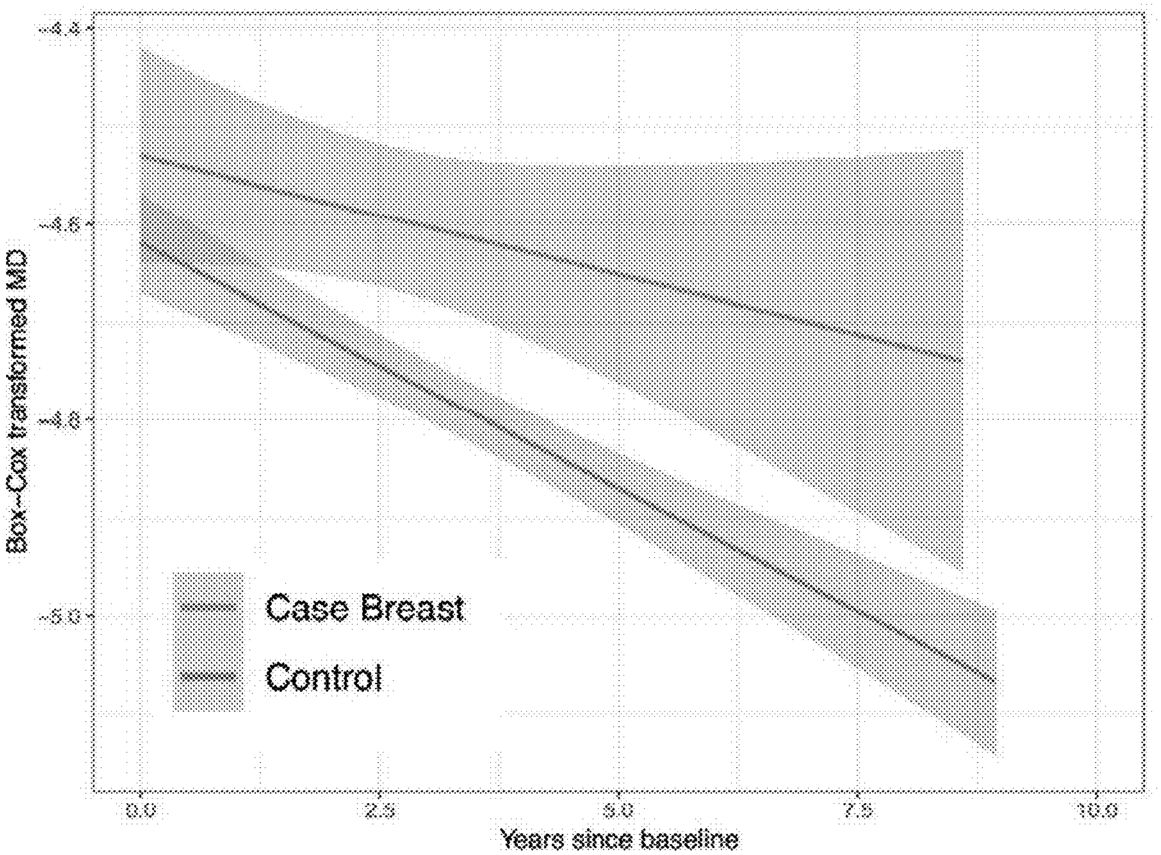
FIG. 22 is a graph of the change in MD for breast cancer positive and negative case women over time.

For these 947 women, the mean number of years between mammograms is 1.3 (10th percentile: 1.0, 90th percentile: 2.0). For the cases, the mean number of years from last mammogram date to diagnosis date was 2.0 years (10th percentile: 1.0, 90th percentile: 3.9) excluding mammograms that are within 6 months of diagnosis (see FIG. 18). The baseline breast cancer risk factors for the women in this study stratified by case and control status are presented in Table 2. At baseline, the majority are postmenopausal and parous. The correlation for the control women at baseline between BMI and average MD is −0.13.

TABLE 2

Risk factors at the time of mammography by case-control status for the cohort.

| | Cases* (n = 289) | Controls (n = 658) |
|---|---|---|
| | Mean (SD) | |
| Age | 56.63 (8.76) | 56.67 (8.69) |
| BMI | 29.27 (6.27) | 27.41 (6.18) |
| Number of longitudinal Mammograms** | 3.73 (2.18) | 4.98 (2.45) |

TABLE 2-continued

Risk factors at the time of mammography by case-control status for the cohort.

| | Cases* (n = 289) | Controls (n = 658) |
|---|---|---|
| Number of years between mammograms** | 1.27 (0.58) | 1.35 (0.76) |
| Years between last mammogram and diagnosis date** | 1.98 (1.45) | — |
| | No. (%) | |
| BI-RADS | | |
| A | 18 (6.23%) | 20 (3.04%) |
| B | 157 (54.32%) | 363 (55.17%) |
| C | 88 (30.44%) | 229 (34.80%) |
| D | 19 (6.57%) | 38 (5.78%) |
| Post-menopausal status | 209 (72.32%) | 482 (73.25%) |
| Parous | 228 (78.89%) | 508 (77.20%) |
| Family history of breast cancer | 65 (22.49%) | 125 (19.00%) |
| History of biopsy-confirmed benign breast disease | 87 (30.10%) | 177 (26.90%) |
| Alcohol | 153 (52.94%) | 411 (62.46%) |
| Race | | |
| white | 228 (78.89%) | 535 (81.31%) |
| black | 56 (19.38%) | 85 (12.92%) |
| others | 2 (0.68%) | 18 (2.74%) |
| NR | 3 (1.04%) | 20 (3.04%) |
| Time to cancer, years | | |
| 0.5-1 | 12 (4.15%) | — |
| 1-2 | 28 (9.69%) | — |
| 2-3 | 36 (12.46%) | — |
| 3-4 | 31 (10.73%) | — |
| 4-5 | 32 (11.07%) | — |
| 5-6 | 43 (14.88%) | — |
| 6-7 | 34 (11.76%) | — |
| 7-8 | 41 (14.19%) | — |
| 8-9 | 24 (8.30%) | — |
| 9-10 | 8 (2.77%) | — |

Continuous covariates are reported with mean and standard deviation (SD);
binary covariates are reported by the number of positive responses and their corresponding percentage;
(NR = not reported).

Following the routine clinical practice of averaging density between two breasts, longitudinal average MD was first evaluated in relation to breast cancer. In Table 2, it is seen that at baseline MD is significantly higher for cases compared to controls (beta=0.140, P<0.01) and that the density decrease over time (in years) was statistically significant among postmenopausal women. Also consistent with the large body of evidence, higher BMI is associated with lower density at baseline and BBD is associated with higher density. Women who are postmenopausal at baseline are not different from premenopausal women, but over follow-up, postmenopausal women have a significantly greater decrease in density per year (−0.059) than premenopausal women after controlling for age, BMI, and other risk factors summarized in Table 3. Family history of breast cancer, parity, and alcohol intake at baseline are not significantly related to density. In this multivariate analysis with density averaged between breasts, density change over time for cases did not differ from change over time for the controls (represented by time*status, beta=0.018, P=0.10).

TABLE 3

Estimates of the linear mixed effects model using longitudinal Box-Cox transformed MD averaged between the left and right breast and association with breast cancer among 947 women followed over 10 years with a median of 4 mammograms per woman over 5.9 years, excluding women who had breast cancer diagnosed within the first 6 months since baseline and mammograms 6 months before diagnosis.

| Risk Factors | Estimate | 95% CI | P-value |
|---|---|---|---|
| Age (yrs) | −0.019 | (−0.027, −0.012) | <0.01 |
| Time (yrs) | 0.009 | (−0.036, 0.017) | 0.50 |
| Status (case) | 0.140 | (0.032, 0.245) | <0.01 |
| Menopausal (post) | 0.022 | (−0.131, 0.175) | 0.78 |
| BMI ($kg/m^2$) | −0.042 | (−0.050, −0.034) | <0.01 |
| BBD | 0.178 | (0.067, 0.285) | <0.01 |
| Family history | −0.054 | (−0.173, 0.067) | 0.38 |
| Parous | 0.105 | (−0.009, 0.224) | 0.08 |
| Alcohol | −0.088 | (−0.189, 0.011) | 0.08 |
| Time*Status | 0.018 | (−0.004, 0.040) | 0.10 |
| Time*Menopausal (post) | −0.059 | (−0.079, −0.039) | <0.01 |
| Time*BMI | 0.006 | (−0.007, −0.004) | <0.01 |
| Time*BBD | 0.017 | (−0.002, 0.035) | 0.08 |
| Time*Family history | 0.016 | (−0.005, 0.037) | 0.13 |
| Time*Parous | −0.012 | (−0.033, 0.008) | 0.23 |
| Time*Alcohol | 0.017 | (0.000, 0.035) | 0.05 |

Age is centered on a mean age of 54 years;
BMI is centered on a mean of 27 $kg/m^2$.

Figure 17:
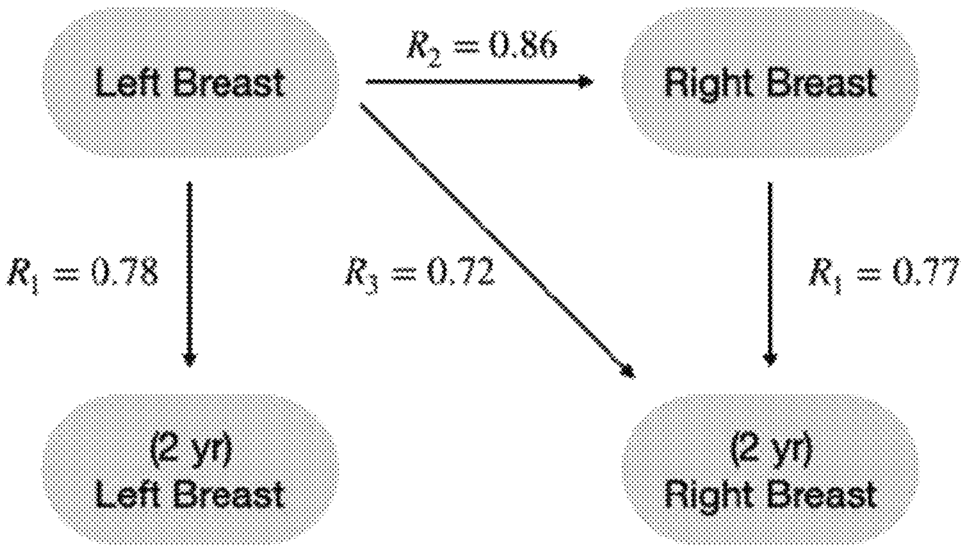
FIG. 17 is a schematic illustration of three types of correlations using Box-Cox transformed breast densities in the control women: R1=correlation within the same breast over time; R2=inter-breast correlation within the same woman; R3=cross-correlation between breasts at different time points.

To reflect the underlying biologic process of breast cancer growth from premalignant lesion to detectable malignancy, the association of MD in each breast over time in relation to future diagnosis of breast cancer was next evaluated. Three types of correlations associated with this analysis for MD in the control women are shown (FIG. 17). It is seen that the 2-year estimated correlation within the same breast over time is 0.78 for the left breast and 0.77 right breast. The inter-breast correlation within the same women is 0.86, and the cross-correlation between breasts at different time points (2-year gap) was 0.72 in the cohort.

Table 4 summarizes the multivariate analysis of breast-specific MD and it was observed that associations of age, time, menopause, BBD, and BMI remain unchanged. At baseline, the breast that did not develop breast cancer within the future case women is significantly denser than the control women (P<0.01), and the breast that developed breast cancer within the case women is also significantly denser than the control women (P=0.03). In addition, a significant change (P=0.04) in the breast that develops breast cancer within the case of women patients from the control women over time is seen (represented by time*$Dik^{(3)}$ 0.027 (95% CI 0.002, 0.053)). For a 54-year-old postmenopausal woman with a mean BMI and no risk factors, the decrease in density in either breast per year relative to the control women free from cancer is −0.079 per year. Within women that will develop breast cancer in the future, the decrease in density for that breast that is free from cancer is −0.079+0.021=−0.058 per year, and 0.079+0.027=−0.052 per year for the breast that will develop breast cancer. Thus, the density of the breasts will significantly diverge over time between the case breast and control women.

TABLE 4

Estimates of the linear mixed effects model using breast-specific longitudinal Box-Cox transformed MD and association with breast cancer among 947 women followed over 10 years with a median of 4 mammograms per woman over 5.9 years, excluding women who had breast cancer diagnosed within the first 6 months since baseline and mammograms 6 months before diagnosis.

| Risk Factors | Estimate | 95% CI | P-value |
|---|---|---|---|
| Age (yrs) | −0.024 | (−0.033, −0.015) | <0.01 |
| Time (yrs) | −0.010 | (−0.035, 0.015) | 0.45 |
| $D_{ik}^2$ (breast no ca) | 0.202 | (0.063, 0.339) | <0.01 |
| $D_{ik}^3$ (breast develops ca) | 0.156 | (0.014, 0.290) | 0.03 |
| Menopausal (post) | 0.033 | (−0.155, 0.222) | 0.73 |
| BMI (kg/m$^2$) | −0.053 | (−0.062, −0.043) | <0.01 |
| BBD | 0.214 | (0.091, 0.343) | <0.01 |
| Family history | −0.070 | (−0.213, 0.076) | 0.34 |
| Parous | 0.132 | (−0.004, 0.276) | 0.06 |
| Alcohol | −0.111 | (−0.231, 0.009) | 0.07 |
| Time $*D_{ik}^2$ | 0.021 | (−0.005, 0.047) | 0.11 |
| Time $*D_{ik}^3$ | 0.027 | (0.002, 0.053) | 0.04 |
| Time * Menopausal (post) | 0.079 | (−0.097, −0.061) | <0.01 |
| Time * BMI | −0.007 | (−0.009, −0.006) | <0.01 |
| Time * BBD | 0.022 | (0.005, 0.040) | 0.01 |
| Time * Family history | 0.018 | (−0.002, 0.038) | 0.08 |
| Time * Parous | −0.016 | (−0.035, 0.002) | 0.09 |
| Time * Alcohol | 0.022 | (0.006, 0.038) | <0.01 |

Age is centered on a mean age of 54 years; BMI is centered on a mean of 27kg/m$^2$.

To illustrate this significant change in density over follow-up, the MD for the case breasts within the case women and control women group by the year of follow-up is shown in FIGS. 20A, 20B, 20C, and 20D. A much slower decrease in MD is seen for the case breasts over follow-up as compared to the control breasts within the control women with non-overlapping 95% empirical confidence intervals. Similar trends were observed for Box-Cox MD over time for positive and negative breast cancer patients (see FIG. 15).

What is claimed is:

1. A system for automatically estimating a volumetric percent density (VPD), dense volume (DV), and non-dense volume (NDV) of at least one individual breast of a subject obtained from at least one medical image of at least one breast, the system comprising at least one processor in communication with at least one memory device, wherein the at least one processor is configured to:

a. receive the at least one medical image, each medical image obtained from the individual breast and comprising a plurality of pixels and associated pixel coordinates and pixel values, wherein each pixel value is indicative of a density of breast tissue within the pixel;

b. automatically determine a threshold pixel value for each medical image based on the pixel values of the plurality of pixels by performing a multi-fold cross-validation over a range of candidate threshold values and selecting the candidate threshold value with the smallest mean squared error (MSE) over all folds of the cross-validation as the threshold pixel value;

c. classify each pixel with a pixel value greater than the threshold pixel value as a dense pixel containing dense breast tissue and the remaining pixels as non-dense pixels containing non-dense breast tissue; and d. estimate the volumetric percent density (VPD), dense volume (DV), and non-dense volume (NDV) for each medical image based on the volumes of all dense pixels and all non-dense pixels of each medical image;

wherein automatically determining the threshold pixel value reduces the computational time required to estimate the VPD, DV, and NDV.

2. The system of claim 1, wherein the at least one medical image is selected from a 2D mammogram, a planar section of a 3D digital breast tomosynthesis image, a planar slices of an MRI image, an X-ray image, and a planar slice of a CT image.

3. The system of claim 1, wherein the at least one medical image comprises medical images of both breasts of an individual, and the at least one processor is further configured to average the VPD, DV, and NDV from the medical images of both breasts of the individual.

4. The system of claim 1, wherein the at least one processor is further configured to pre-process the at least one medical image to remove pixels representative of pectoral muscle, skin, and any combination thereof from the at least one medical image.

5. The system of claim 4, wherein the at least one processor pre-processes the at least one medical image by enhancing contrast within the at least one medical image, performing edge detection in the enhanced-contrast image, and removing pixels adjacent to the detected edge.

* * * * *